(12) United States Patent
Renteria et al.

(10) Patent No.: US 12,152,879 B1
(45) Date of Patent: Nov. 26, 2024

(54) LAYOUT MARKING SYSTEM FOR TRACING REFERENCE REGIONS IN A CONSTRUCTION LAYOUT AND A METHOD THEREOF

(71) Applicants: Rigoberto Renteria, El Paso, TX (US); Heber Renteria, Horizon, TX (US)

(72) Inventors: Rigoberto Renteria, El Paso, TX (US); Heber Renteria, Horizon, TX (US)

( * ) Notice: Subject to any disclaimer, the term of this patent is extended or adjusted under 35 U.S.C. 154(b) by 0 days.

(21) Appl. No.: 18/788,244

(22) Filed: Jul. 30, 2024

(51) Int. Cl.
G01C 11/02 (2006.01)
G01C 15/06 (2006.01)

(52) U.S. Cl.
CPC .............. G01C 11/02 (2013.01); G01C 15/06 (2013.01)

(58) Field of Classification Search
CPC ................................ G01C 11/02; G01C 15/06
See application file for complete search history.

(56) References Cited

U.S. PATENT DOCUMENTS

| | | | | |
|---|---|---|---|---|
| 5,100,229 | A * | 3/1992 | Lundberg | G01C 15/002 356/141.5 |
| 5,137,354 | A * | 8/1992 | deVos | G01C 15/002 356/141.5 |
| 8,595,946 | B2 * | 12/2013 | Hayes | G01C 15/004 33/1 G |
| 8,943,701 | B2 * | 2/2015 | Hayes | G01C 15/002 33/1 G |
| 9,233,751 | B2 * | 1/2016 | Metzler | B64C 19/00 |
| 10,145,676 | B2 * | 12/2018 | Hayes | G01S 17/89 |
| 10,317,184 | B1 * | 6/2019 | Keller | G01B 11/026 |
| 10,935,369 | B2 * | 3/2021 | Hayes | G06F 15/00 |
| 11,226,199 | B2 * | 1/2022 | Unger | G01C 3/08 |
| 11,360,310 | B2 * | 6/2022 | Lawver | G06F 3/011 |
| 11,435,182 | B2 * | 9/2022 | Hajmousa | G01C 15/06 |
| 11,802,764 | B2 * | 10/2023 | Unger | G01S 7/003 |
| 11,821,730 | B2 * | 11/2023 | Kahle | G01C 21/3826 |
| 12,013,239 | B2 * | 6/2024 | Nishita | G01C 15/06 |
| 12,025,467 | B2 * | 7/2024 | Müller | G06T 7/70 |
| 12,085,378 | B2 * | 9/2024 | Müller | G01C 15/002 |
| 12,085,379 | B2 * | 9/2024 | Müller | G01C 15/06 |
| 2022/0011577 | A1 * | 1/2022 | Lawver | G02B 27/0101 |
| 2023/0152093 | A1 * | 5/2023 | Kahle | G06F 3/011 345/633 |
| 2023/0302626 | A1 * | 9/2023 | Schmidt | E01C 23/163 |

(Continued)

*Primary Examiner* — Yaritza Guadalupe-McCall
(74) *Attorney, Agent, or Firm* — Evergreen Valley Law Group; Kanika Radhakrishnan

(57) ABSTRACT

The present disclosure relates to a layout marking system for tracing reference regions and a method thereof. The layout marking system includes a support frame, a layout marking module, a position controller, and a control circuitry. The position controller extracts an offset value based on applying a vision processing algorithm and determines a current position of a localization and positioning device in the construction layout based on the offset value. The layout system includes a control circuitry configured to receive a control signal from the position controller for operating an actuator based on the offset value. The control signal includes an operating distance and an operating direction. The control circuitry further dynamically operates the actuator based on the sensory data, the operating distance, and the operating direction, thereby operating the layout marking module to trace the reference region while the layout marking system navigates to the reference region.

20 Claims, 16 Drawing Sheets

(56) References Cited

U.S. PATENT DOCUMENTS

| | | | |
|---|---|---|---|
| 2023/0314618 A1* | 10/2023 | Metzler | G01C 15/002 |
| | | | 356/4.01 |
| 2024/0060774 A1* | 2/2024 | Kahle | G01C 21/3826 |
| 2024/0151529 A1* | 5/2024 | Fonken | G01C 15/04 |
| 2024/0151530 A1* | 5/2024 | Burczyk | G01C 15/04 |
| 2024/0151551 A1* | 5/2024 | Lawver | G01C 21/005 |

* cited by examiner

LAYOUT MARKING SYSTEM FOR TRACING REFERENCE REGIONS IN A CONSTRUCTION LAYOUT AND A METHOD THEREOF

TECHNICAL FIELD

The present invention relates generally to construction layout surveying instruments and more particularly relates to a layout marking system for tracing a reference region in a construction layout and a method thereof.

BACKGROUND

In the construction field, accurately marking layouts such as building foundations, utility lines, and other structures is vital for ensuring the precise execution of design plans. Traditionally, the task relied on manual measurements and marking methods, which are labor-intensive, time-consuming, and prone to human errors. As projects grow in scale or complexity, maintaining accuracy becomes increasingly challenging. Additionally, environmental factors like terrain irregularities, adverse weather conditions, and limited visibility further complicate the accuracy of the layout marking. Conventionally, manual methods are utilized in construction layout marking, which often leads to inaccuracies and inconsistencies. Moreover, the conventional approaches are not suitable for projects with intricate designs.

Over time, layout marking systems in construction have primarily utilized tools such as total stations with prisms. Total stations, optical instruments combining a theodolite with an electronic distance meter (EDM), are commonly employed for precise measurements of angles, distances, and coordinates. Paired with retroreflective prisms placed strategically on a construction site, total stations can accurately determine positions by emitting laser beams and measuring the reflected signals. While effective, these systems require skilled operators and can be time-consuming to set up and operate. In recent years, technological advancements have led to the development of more automated and efficient layout marking solutions. These advanced systems leverage tools such as GPS, laser scanning, and computer vision to streamline the marking process, reduce labor requirements, and improve accuracy. However, these solutions come with their challenges, including initial investment costs and the need for personnel training in surveying and layout techniques which consumes a lot of time and resources.

Therefore, there is a need for a layout marking system and a method for accurately marking the layout in the construction site in a cost-effective manner to overcome the aforementioned deficiencies along with providing other advantages.

SUMMARY

Various embodiments of the present disclosure disclose a layout marking system and a method for tracing reference regions in a construction layout.

In an embodiment, a layout marking system is disclosed. The layout marking system includes a support frame, a localization and positioning device, and a sensor unit. The localization and positioning device is movably disposed on the support frame via a conveyor associated with the support frame. The sensor unit is configured to generate sensory data including coordinates of the layout marking system, inertial movement calculations and a rotation angle of a maneuvering unit of the layout marking system. Further, the layout system includes a layout marking module coupled to the support frame via the conveyor, thereby allowing the layout marking module to move along a length of the support frame. The layout system further includes a position controller configured to extract an offset value based at least on applying a vision processing algorithm to capture an area corresponding to the offset value in a construction layout depicted on the position controller. Further, the position controller determines a current position of the localization and positioning device in the construction layout based at least on the offset value. The offset value indicates a distance between the current position of the localization and positioning device from a reference region of the construction layout. The layout system further includes a control circuitry communicably coupled to the position controller, the layout marking module, and the sensor unit. The control circuitry is configured to at least receive a control signal from the position controller for operating an actuator coupled to the conveyor based at least on the determined offset value, the control signal including an operating distance, and an operating direction of the actuator. The control circuitry further dynamically operates the actuator based at least on the sensory data, the operating distance, and the operating direction, thereby operating the layout marking module to trace the reference region while the layout marking system navigates to and along the reference region.

In another embodiment, a method for tracing reference regions in a construction layout is disclosed. The method includes generating, by a sensor unit, sensory data including coordinates of a layout marking system, and a rotation angle of a maneuvering unit of the layout marking system. Further, the method includes extracting, by a position controller, an offset value based at least on applying a vision processing algorithm to capture an area corresponding to the offset value in a construction layout depicted on the position controller. The offset value indicates a distance between a current position of a localization and positioning device from a reference region of the construction layout. The method further includes determining, by the position controller, location coordinates of the localization and positioning device in the construction layout based at least on the offset value. Furthermore, the method includes receiving, by a control circuitry, a control signal from the position controller for operating an actuator coupled to a conveyor based at least on the determined offset value. The control signal includes an operating distance and an operating direction of the actuator. Further, the method includes in response to the control signal, dynamically operating, by the control circuitry, the actuator based at least on the sensory data, the operating distance, and the operating direction, thereby operating the layout marking module to trace the reference region while the layout marking system navigates to the reference region.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or conjunction with each other, one skilled in the art will appreciate that many of these features can be provided independently of other features.

Various embodiments of the present invention are described hereinafter with reference to FIGS. 1A and 1B to FIG. 9.

Figure 1A:
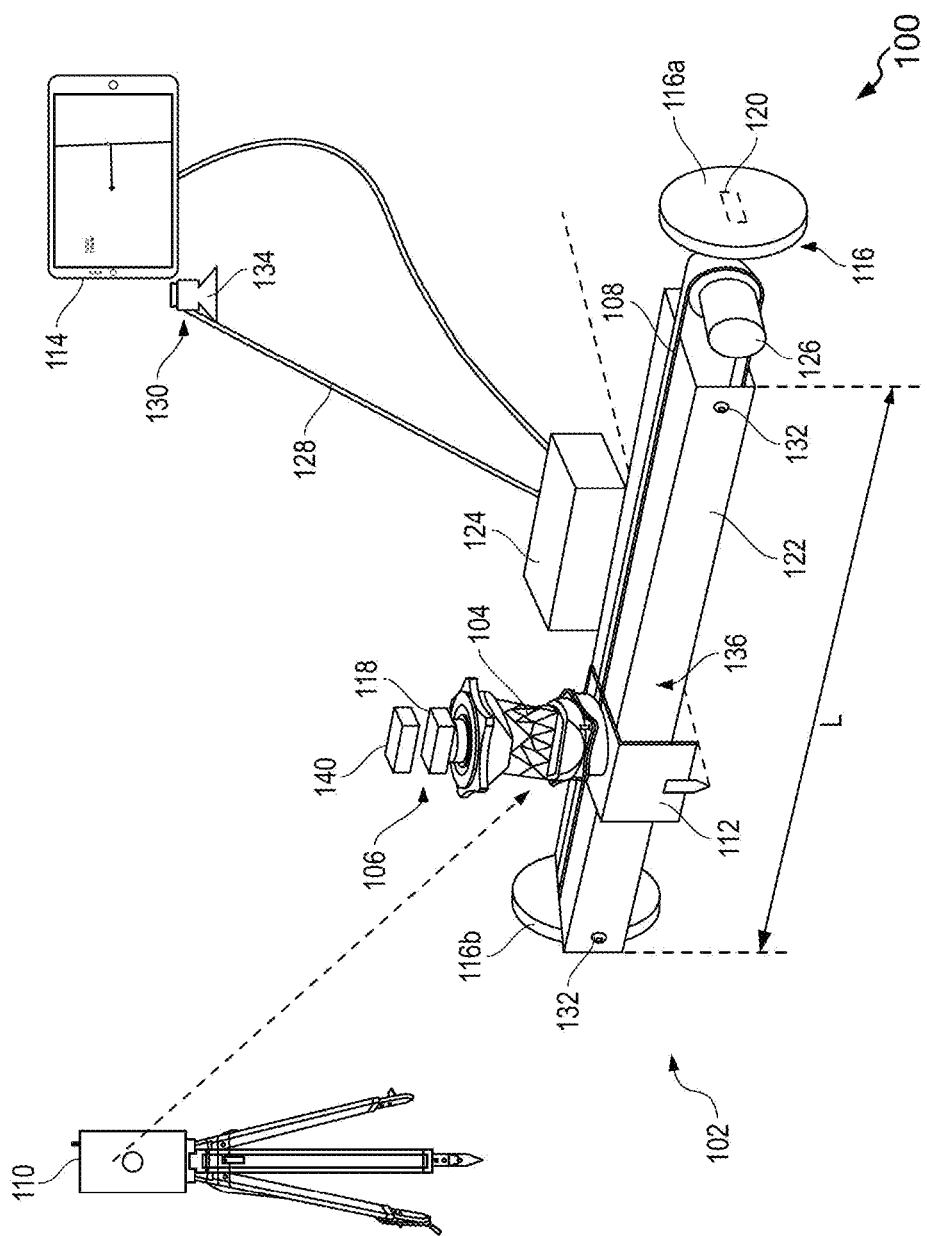
FIG. 1A illustrates a schematic representation of an environment related to various embodiments of the present disclosure.

FIG. 1A illustrates a schematic representation of an environment 100 related to various embodiments of the present disclosure. The environment 100 includes a layout marking system 102. The layout marking system 102 includes a support frame 122, a localization and positioning device 104, and a sensor unit 106. The support frame 122 is a framework or structure used to support one or more components of the layout marking system 102. The support frame 122 may be designed in various sizes and configurations depending on their intended use and the specific requirements of the application. Further, the support frame 122 provides stability while supporting the components of the layout marking system 102 and facilitates the movement of the components in a safe and efficient manner which will be explained further in detail.

The localization and positioning device 104 is movably disposed on the support frame 122 via a conveyor 108 associated with the support frame 122. The localization and positioning device 104 may include a surveying retroreflective prism. The localization and positioning device 104 is configured for optical surveying and distance measurement of the layout marking system 102. In particular, the localization and positioning device 104 is configured to reflect an electronic distance measurement (EDM) signal relative to a layout surveying apparatus 110. The layout marking system 102 is navigated based on the EDM signal.

Further, the layout marking system 102 includes a layout marking module 112. The layout marking module 112 is coupled to the support frame 122 via the conveyor 108. As shown, the localization and positioning device 104 is mounted on the layout marking module 112, and the layout marking module 112 is movably coupled to the support frame 122 via the conveyor 108. This allows the layout marking module 112 to traverse along a length (L) of the support frame 122. For example, the conveyor 108 may be a belt conveyor system. Alternatively, other types of conveyors such as chain conveyors, cable conveyors, etc., may be used in the layout marking system 102 as per the design feasibility and requirements. Further, the layout marking module 112 is configured to accurately mark positions, lines, or points on a construction site based on layout plans, blueprints, or design specifications which will be explained further in detail.

The sensor unit 106 is communicably coupled to a control circuitry 124 of the layout marking system 102. The sensor unit 106 includes a first sensor unit 118 and a second sensor unit 120 for accurately determining the orientation and position of the layout marking system 102 in real-time. This will enhance the speed and accuracy of tracing pathways or marking points by the layout marking module 112. In other words, the sensor unit 106 (i.e., the first sensor unit 118 and the second sensor unit 120) is configured to generate sensory data associated with the layout marking system 102. The sensory data includes at least coordinates of the layout marking system 102, and a rotation angle of a maneuvering unit 116 of the layout marking system 102. As shown, the maneuvering unit 116 includes a pair of rotary wheels such as a rotary wheel 116a and a rotary wheel 116b. Further, each rotary wheel 116a and 116b is rotatably coupled to either end of the support frame 122.

The first sensor unit 118 is communicably coupled to the control circuitry 124. The first sensor unit 118 corresponds to an attitude and heading reference system (AHRS) of the layout marking system 102. The first sensor unit 118 may include a plurality of sensors configured to at least compute a displacement metric of the layout marking system 102. In particular, the first sensor unit 118 may be an inertial measurement unit (IMU). The first sensor unit 118 may include the sensors such as an accelerometer, a magnetometer, and an inclinometer (not shown in Figures). The accelerometer measures accelerations like movement or gravity itself. The inclinometer is configured to sense a local orientation of the layout marking system 102. The magnetometer computes an angular reference with the magnetic field of the earth. It is to be noted that, each of the above sensors of the first sensor unit 118 when used individually in the layout marking system 102 may possess errors and a bias in their measuring methods. Hence, each of the above sensors is used in the first sensor unit 118 to improve the accuracy in generating the sensory data associated with the layout marking system 102 by implementing a sensor fusion algorithm. For example, the sensor fusion algorithm may include Kalman Filter and Madgwick Orientation Filter.

Specifically, the control circuitry 124 is configured to process the sensory data generated by the first sensor unit 118 for creating a reference system to accurately represent the current position and orientation of the layout marking system 102 (or the localization and positioning device 104). Further, creating the reference system to accurately represent the coordinates of the layout marking system 102 is referred to as Dead Reckoning Localization. In other words, the first sensor unit 118 determines the displacement metric of the layout marking system 102 for predicting the coordinates of the layout marking system 102 in a construction layout. This is done by integrating the equations of motion from the acceleration vector ($m/s^2$) to velocity (m/s) and position (x,y) followed by integration of the measurements from the magnetometer and the accelerometer to get an accurate heading for navigating the layout marking system 102 in the construction layout.

The second sensor unit 120 is communicably coupled to the control circuitry 124. The second sensor unit 120 includes an encoder mounted to each wheel 116a and 116b. The wheels 116a and 116b may be referred to as encoder wheels. The second sensor unit 120 (i.e., the encoder wheels) is configured to determine a rotation angle of the maneuvering unit 116 of the layout marking system 102. In other words, the encoder wheels (or the second sensor unit 120) are used to precisely measure the movement of the layout marking system 102 across the construction site/layout. Specifically, the second sensor unit 120 may be mounted to the wheels 116a and 116b or an axle (not shown in Figures) connecting the wheels 116a and 116b that makes contact with the ground. For example, the second sensor unit 120 may include rotary encoders. Typically, the rotary encoders convert the rotational movement of the wheels 116a and 116b into electrical signals that can be interpreted by the control circuitry 124. The encoder or the second sensor unit 120 is designed to adapt to various types of terrain commonly encountered on construction sites, including rough surfaces, slopes, and obstacles.

Further, as the layout marking system 102 moves, the second sensor unit 120 rotates along with the wheels 116a and 116b. The rotation of the wheels 116a and 116b is translated into distance measurements by the second sensor unit 120. In other words, another dead-reckoning position is computed by measuring the rotation of the wheels 116a and 116b to calculate the displacement metric of the layout marking system 102. In one example, the displacement metric of the layout marking system 102 is computed by measuring the rotation of the wheels 116a and 116b using the kinematic equations of a differential-drive robot.

The control circuitry 124 may be mounted to the support frame 122. Hence, the control circuitry 124 may be referred to as an on-board control unit of the layout marking system 102. The control circuitry 124 is communicably coupled to a position controller 114 of the layout marking system 102. In an embodiment, the control circuitry 124 may be located remotely in the layout marking system 102 and may be communicably coupled to the components of the layout marking system 102 via wired or wireless communication protocols. Further, the control circuitry 124 may be configured to implement a sensor fusion algorithm to fuse the sensory data generated by the first sensor unit 118 and the second sensor unit 120 to determine the orientation and real-time coordinates of the layout marking system 102 which is further explained in detail.

Figure 1B:
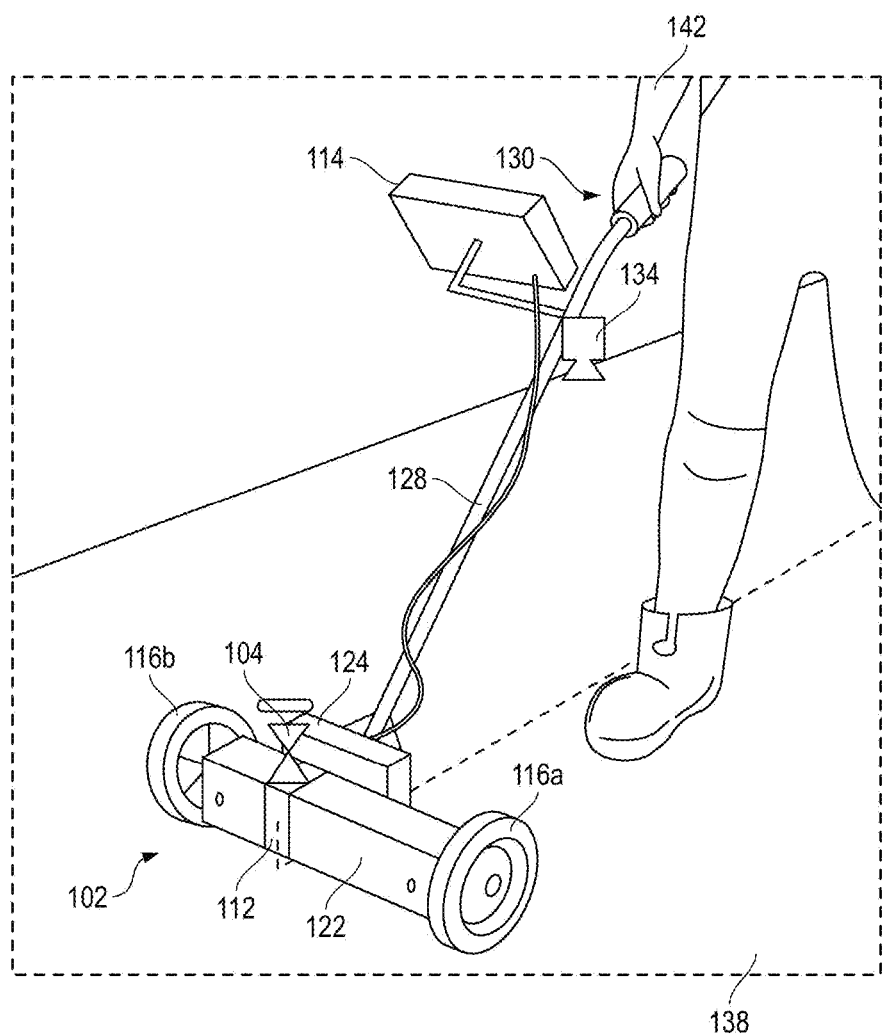
FIG. 1B illustrates a schematic representation of a layout marking system, in accordance with an embodiment of the present disclosure.

The control circuitry 124 is communicably coupled to the position controller 114 via wired communication protocols (as shown in FIGS. 1A and 1B). Some examples of the wired communication protocols may include universal serial bus (USB), RS-232 (Recommended Standard 232), and the like. Alternatively, the control circuitry 124 may be communicably coupled to the position controller 114 via wireless communication protocols. Some examples of the wireless communication protocols may include wireless fidelity (Wi-Fi), Bluetooth, Zigbee, and the like. Further, the control circuitry 124 along with the position controller 114 is configured to determine the coordinates of the current position of the layout marking system 102 (or the localization and positioning device 104) based at least on the displacement metric and the rotation angle of the maneuvering unit 116. The control circuitry 124 may combine the sensory data i.e., the displacement metric and the rotation angle using a Kalman filtering technique. Thereafter, the control circuitry 124 along with the position controller 114 determines the coordinates of the current position of the layout marking system 102.

The control circuitry 124 is further configured to operate the layout marking module 112 to trace a reference region. In particular, the control circuitry 124 operates an actuator 126 to navigate the layout marking module 112 for tracing the reference region in the construction layout. As shown, the actuator 126 is mounted to the support frame 122 and is operatively coupled to the conveyor 108. For example, the actuator 126 may be a stepper motor, a linear actuator, and the like. The actuator 126 may be configured to operate within a predefined range of about -12 inches to about +12 inches for tracing the reference region of the construction layout. The control circuitry 124 may include a proportional integral derivative (PID) controller for operating the actuator 126 based on an offset value received from the position controller 114. It is to be noted that the operation of the actuator 126 moves the layout marking module 112 and the localization and positioning device 104 along the length of the support frame 122 for tracing the reference region in the construction layout which will be explained further in detail.

In one example scenario, the layout marking module 112 may trace a continuous line or a pathway while the layout marking system 102 is maneuvered to the reference region in the construction layout. In another example scenario, the layout marking module 112 may trace/mark a point (e.g., a single dot) in the reference region of the construction layout upon maneuvering the layout marking system 102 to the reference region. Navigating the layout marking system 102 and tracing the reference region by the layout marking module 112 are further explained in greater detail.

As shown, the position controller 114 is mounted to a handle member 128. Further, a top portion 130 of the handle member 128 may be provided with a gripping feature for enabling the user 142 to maneuver the layout marking system 102 across the construction layout for marking or tracing purposes. In use, the position controller 114 may provide a control signal to the control circuitry 124 upon determining the offset value that the layout marking system 102 is to be navigated. The user 142 maneuvers the layout marking system 102 accordingly to trace the reference region (exemplarily represented as 'a continuous line') printed on floor 138 (as shown in FIG. 1B).

In addition, the layout marking system 102 includes at least one first image sensor 132. The first image sensors 132 are mounted to a front portion 136 of the support frame 122. The first image sensors 132 are communicably coupled to the control circuitry 124. The control circuitry 124 is configured to track visual odometry of the layout marking system 102 via the first image sensors 132. The control circuitry 124 implements the vision processing algorithm to estimate the motion of the layout marking system 102 or the first image sensors 132 by analyzing sequential images captured by the first image sensors 132. In other words, the control circuitry 124 tracks the visual odometry of the layout marking system 102 by tracking the movement of the first image sensors 132 or the layout marking system 102 relative to its surroundings, such as changes in position and orientation, based solely on visual input.

Further, the layout marking system 102 includes at least one second image sensor 134. The at least one second image sensor 134 is communicably coupled to the control circuitry 124. The at least one second image sensor 134 is configured to monitor the tracing of the layout marking module 112 and extrapolate direction of movement of the layout marking system 102 if the marking of the straight line is desired (as shown in FIG. 1B). In particular, the at least one second image sensor 134 is mounted to the handle member 128 proximate to the top portion 130. The at least one second image sensor 134 is oriented such that a field of view (FOV) of the at least one second image sensor 134 is towards the floor 138. Hence, the at least one second image sensor 134 is configured to track the printed line (as shown in FIG. 1B) to extrapolate the direction of the layout marking system 102. The control circuitry 124 dynamically aligns the layout marking module 112 based on the extrapolation of the direction of the layout marking system 102 tracked by the at least one second image sensor 134. Some non-limiting examples of the at least one first image sensor 132 and the at least one second image sensor 134 may include, but are not limited to, Charge-Coupled Device (CCD), Complementary Metal-Oxide-Semiconductor (CMOS), and Active Pixel Sensor (APS).

The layout marking system 102 may include a power source (not shown in Figures). The power source is configured to provide electrical power to one or more operating components (for example, the actuator 126, the layout marking unit 112, the control circuitry 124, the sensor unit 106, encoders, etc.) of the layout marking system 102. The power source may be configured to provide one of an alternating current output or a direct current output. In an embodiment, the power source includes a direct current power source, such as a rechargeable battery (for example, a lithium-ion (Li-on) battery), operable to provide the required electrical power for the operation of the layout marking system 102. Further, the power source may include electrical and/or electronic components or circuits for enabling the use of wired or wireless charging. Alternatively, the power source may include electrical and/or electronic components or circuits for enabling the use of alternating current to provide the required electrical power for the operation of the layout marking system 102.

In an embodiment, the layout marking system 102 includes a global positioning system (GPS) 140. The GPS 140 is communicably coupled to the control circuitry 124. The control circuitry 124 facilitates precise positioning and navigation of the layout marking system 102 based on the GPS 140.

Figure 2:
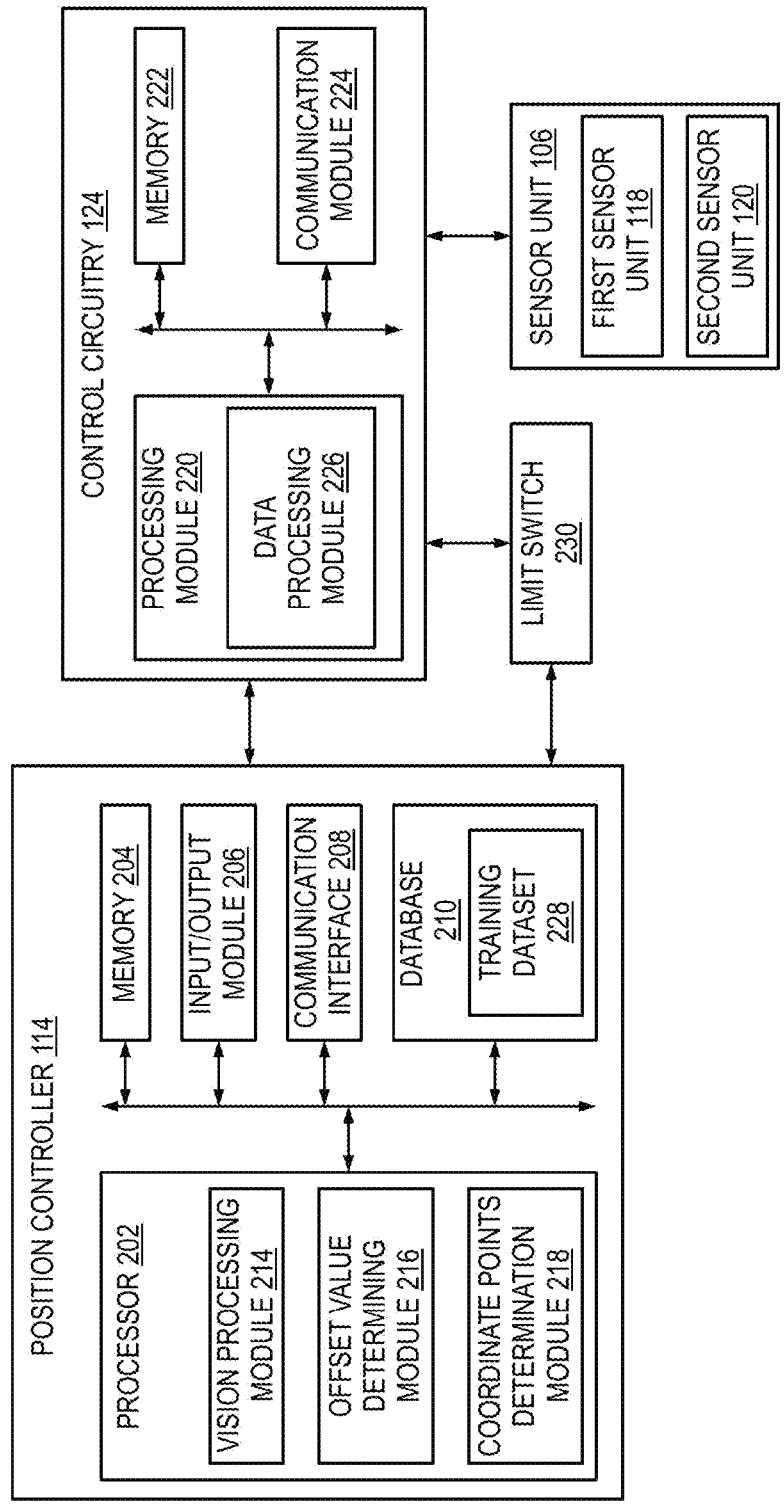
FIG. 2 illustrates a block diagram representation of the layout marking system, in accordance with an embodiment of the present disclosure.

FIG. 2 illustrates a block diagram representation of the layout marking system 102, in accordance with an embodiment of the present disclosure. The position controller 114 includes at least one processor, such as a processor 202 and a memory 204. It is noted that although the position controller 114 is depicted to include only one processor, the position controller 114 may include more processors therein. In an embodiment, the memory 204 is capable of storing machine-executable instructions. Further, the processor 202 is capable of executing the machine-executable instructions to perform one or more operations described herein. In an embodiment, the processor 202 may be embodied as a multi-core processor, a single-core processor, or a combination of one or more multi-core processors and one or more single-core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

The position controller 114 further includes an input/output module 206 (hereinafter referred to as an 'I/O module 206') and at least one communication module such as a communication interface 208. In an embodiment, the I/O module 206 may include mechanisms configured to receive inputs from and provide outputs to the user 142. For example, the I/O module 206 is configured to receive user input from the user 142 related to layout marking, a construction layout, and the like. To that effect, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

The communication interface 208 may include communication circuitry such as for example, a transceiver circuitry including antenna and other communication media interfaces to connect to a wired and/or wireless communication protocol. The communication circuitry may, in at least some example embodiments, enable the transmission of data signals and/or reception of signals from other network entities, such as the database 210, control circuitry 124, the sensor unit 108, or other systems configured to maintain real-time information related to positioning and location of the layout marking system 102.

In an embodiment, the processor 202 includes a vision processing module 214, an offset value determining module 216, and a coordinate points determination module 218. It should be noted that components, described herein, such as the vision processing module 214 and the offset value determining module 216 may be configured in a variety of ways, including electronic circuitries, digital arithmetic, logic blocks, and memory systems in combination with software, firmware, and embedded technologies.

The vision processing module 214 includes suitable logic and/or circuitry to capture an area corresponding to the offset value in a construction layout (see, 302 of FIG. 3) depicted on the position controller 114. The construction layout 302 may be depicted on the I/O module 206 of the position controller 114. Specifically, the processor 202 receives a request from the control circuitry 124 regarding an offset of the layout marking system 102 from the construction layout 302. To that effect, the vision processing module 214 implements a computer vision algorithm or a vision processing algorithm to perform the screen grab feature to capture the area corresponding to the offset value in the construction layout 302 depicted in the I/O module 206 of the position controller 114. Thereafter, the offset value determining module 216 including a suitable logic and/or circuitry extracts the offset value of the layout marking system 102. Further, the processor 202 determines a current position of the localization and positioning device 104 in the construction layout 302 based at least on the offset value. Thus, it is to be understood that the offset value indicates a distance between the current position of the localization and positioning device 104 from the reference region of the construction layout302.

The position controller 114 is trained with a training dataset 228. The training dataset 228 may be stored within the database 210. Specifically, the position controller 114 obtains image data related to the layout marking system 102 positioned at different positions in the construction layout 302. In other words, the vision processing module 214 of the position controller 114 may capture multiple images of the layout marking system 102 in different states (or the different positions) The image data includes one or more offset features assigned for each position of the construction layout 302. Further, each image data may be labeled with the one or more offset features (e.g., x, y coordinates) that need to be predicted. Furthermore, the position controller 114 may preprocess the image data for generating a training dataset 228 for training the position controller 114. The processing of the image data for training may include, but not limited to, resizing the images, normalizing pixel values, and organizing the dataset. Further, the position controller 114 identifies a class among a set of classes for each offset feature of the one or more offset features. The one or more offset features correspond to variables of the offset value which is explained further in detail.

Upon identifying the class for each offset feature, the position controller 114 defines each offset feature of the one or more offset features for the corresponding class of the set of classes to generate the training dataset for determining the location coordinates of the localization and positioning device 104 based at least on the offset value. The one or more offset features may include numerical values (0-9), decimal (.), and algebraic sign (−). The offset features including the numerical values (0-9), the decimal (.), and the algebraic sign (−) may be associated with the set of classes i.e., class (0-9), class (.), and class (−). For example, class 'zero' is trained using the numerical value '0' depicted in the image data. Similarly, training for class "one" is done using this image data depicting the numerical value '1', and so for the numerical values (2,3,4,5,6,7,8,9), the decimal (.), and the algebraic sign (−). Thus, the training dataset 228 is generated upon defining each of the offset features for each class of the set of classes.

Upon deployment of the position controller 114 trained with the training dataset 228, the coordinate points determination module 218 including a suitable logic and/or circuitry identifies the class among the set of classes associated with each variable of the determined offset value. For example, the determined offset value may be −0.37, where each entity such as (−), (.), (0), (3), and (7) of the offset value −0.37 corresponds to the variable of the offset value −0.37. In this scenario, the coordinate points determination module 218 determines the class for each variable of the offset value −0.37 as a class (−), a class (0), a class (.), a class (3), and a class (7). Further, the coordinate points determination module 218 extracts coordinate points defined for the class associated with each variable of the offset value. In the above example, the coordinate points defined for each class are as follows:

Class (−) is at coordinate points 10,10
Class (0) is at coordinate points 15,10
Class (.) is at coordinate points 20,10

Class (3) is at coordinate points 25,10

Class (7) is at coordinate points 30,10

Thereafter, the processor 202 determines the current position of the localization and positioning device 104 in the construction layout 302 based at least on the coordinate points associated with each variable of the offset value.

The control circuitry 124 includes at least one processor such as a processing module 220 for executing instructions. Instructions may be stored in, for example, but not limited to, a memory 222. The processing module 220 may include one or more processing units (e.g., in a multi-core configuration). The processing module 220 is operatively coupled to a communication module 224 such that the control circuitry 124 is capable of communicating with other devices such as the position controller 114, the sensor unit 106, the localization and positioning device 104, the first image sensors 132, the second image sensors 134 or any other entity of FIG. 1A.

In an embodiment, the processing module 220 includes a data processing module 226. The data processing module 226 module is configured to process the visual odometry, the sensory data, and inputs (or the control signal) from the position controller 114. In particular, the data processing module 226 is configured to implement the sensor fusion algorithm to process the sensory data for determining the orientation and position of the layout marking system 102 in real time. Further, real-time determination of the orientation and position of the layout marking system 102 is already explained with reference to FIGS. 1A and 1B, therefore it is not reiterated herein for the sake of brevity.

Further, the processing module 220 receives the control signal from the position controller 114 upon determining the offset value. The control signal is appended with an operating distance, and an operating direction of the actuator 126. In other words, the position controller 114 determines operating pulses to operate the actuator 126 based on the offset value. For instance, the position controller 114 converts the offset value to a number of steps (i.e., the operating distance and the operating direction) to operate the actuator 126 (i.e., the stepper motor). The position controller 114 appends the operating pulses (i.e., the operating distance and the operating direction) in the control signal and transmits the control signal to the processing module 220. The processing module 220 operates the actuator 126 based on the sensory data, the operating distance, and the operating direction. As a result, the layout marking module 112 is operated to trace the reference region while the layout marking system 102 navigates to the reference region. In particular, the processing module 220 determines whether the localization and positioning device 104 is within a threshold operating range for tracing the reference region of the construction layout. The processing module 220 determines whether the localization and positioning device 104 is within the threshold operating range based at least on the sensory data and the visual odometry. The threshold operating range is defined based on the structural configuration of the layout marking module 112, the predefined range of the actuator 126, and the like. In other words, the threshold operating range is the printing range (or tracing range) of the layout marking module 112.

In case the localization and positioning device 104 is within the threshold operating range, the processing module 220 dynamically operates the actuator 126 based at least on the sensory data, the operating distance, and the operating direction, thereby operating the layout marking module 112 to trace the reference region. In other words, if the layout marking system 102 is within the threshold operating range, the actuator 126 operates the layout marking module 112 to move along the length (L) (or left or right) of the support frame 122 for tracing (or marking) the reference region in the construction layout 302. In one scenario, the layout marking module 112 may trace a pathway of the layout marking system 102 while the layout marking system 102 navigates to the reference region of the construction layout 302. In another scenario, the layout marking module 112 may trace at least one point in the reference region of the construction layout 302 upon positioning the layout marking system 102 within the threshold operating range.

In case the localization and positioning device 104 is not within the threshold operating range, the layout marking system 102 is manually navigated to the reference region or within the threshold operating range. Specifically, the layout marking system 102 may include a limit switch (see, 230 of FIG. 2). The limit switch 230 is communicably coupled to the control circuitry 124. The limit switch 230 is configured for operating the layout marking module 112 between the threshold operating range. Further, the limit switch 230 is configured to transmit an alert signal to the control circuitry 124 in case the layout marking module 112 is positioned at a distance exceeding the threshold operating range. For example, if the distance from the reference region is 15 inches (i.e., the threshold operating range), the layout marking module 112 may be operated to move to 15 inches along the support frame 122 due to the operation of the actuator 126. Further, if the layout marking module 112 reaches either end of the support frame 122, the limit switch 230 is triggered. For example, if the layout marking module 112 reaches 10 inches by moving along the support frame 122 due to the operation of the actuator 126. In this example, the layout marking module 112 moved by 10 inches along the support frame 122 may reach the end of the support frame 122, thus triggering the limit switch 230. The limit switch 230 transmits an alert signal to the control circuitry 124 indicating the layout marking module 112 is positioned at a distance (e.g., 5 inches) exceeding the threshold operating range. In other words, the limit switch 230 indicates that the layout marking module 112 has moved 10 inches and reached the limit and the layout marking module 112 is 5 inches away from the threshold operating range. In this scenario, the layout marking system 102 may be manually navigated to the threshold operating range by moving the layout marking system 102 by 5 inches. Upon positioning the layout marking module 112 within the threshold operating range, the processing module 220triggers the actuator 126 to operate the layout marking module 112 to trace the reference region.

Figure 3:
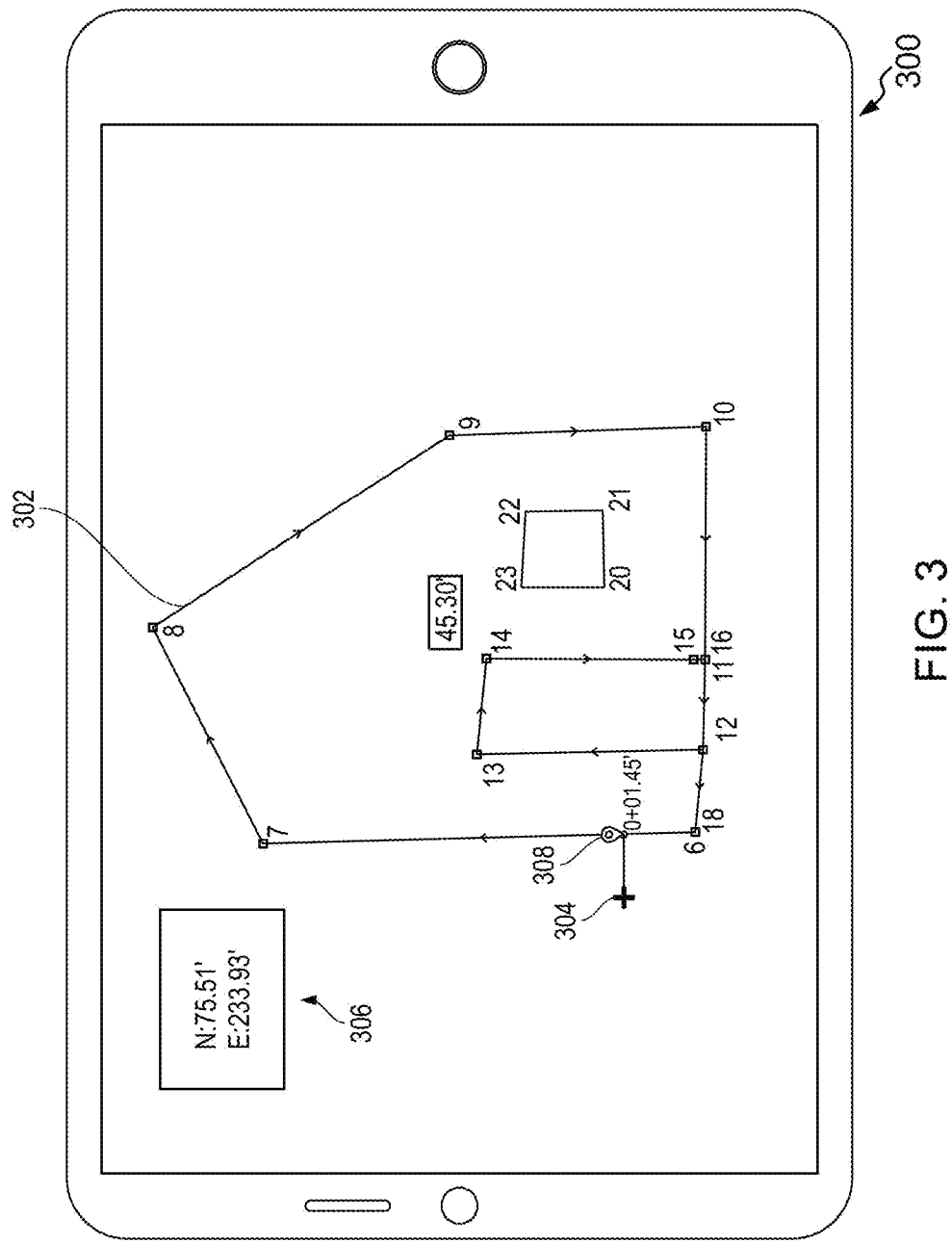
FIG. 3 illustrates an example representation of a user interface (UI) depicted depicting a construction layout in the position controller, in accordance with an embodiment of the present disclosure.

FIG. 3 illustrates an example representation of a user interface (UI) 300 depicted in the position controller 114, in accordance with an embodiment of the present disclosure. As shown, the UI 300 depicts the construction layout 302. The UI 300 is depicted to include a current position 304 of the layout marking system 102 (or the localization and positioning device 104) in the construction layout 302. Further, the UI 300 is depicted to include a parameter section 306. The parameter section 306 depicts an offset value (exemplarily depicted to be '−0.37') and coordinates of the localization and positioning device 104 in the construction layout 302. The offset value indicates the layout marking system 102 is to be moved about 0.37 feet to the right (i.e., the operating direction) to position the layout marking system 102 in a reference region 308 (exemplarily depicted to 'a point') of the construction layout 302. It is to be noted that the operating direction is determined to be right based on the negative sign (−) associated with the offset value (e.g., −0.37).

As explained above, the position controller 114 implements the vision processing algorithm to perform the screen grab feature for capturing the offset value (i.e., −0.37) appearing in the UI 300. Thereafter, the position controller 114 may apply a pass through filter to apply color to highlight the offset value in the UI 300. The position controller 114 further determines the coordinate points based on the offset value. Further, the position controller 114 determines the current position of the localization and positioning device 104 in the construction layout 302 based on the coordinate points as explained above. Then, the control circuitry 124 triggers the actuator 126 to operate the layout marking module 112 to trace the reference region 308. The layout marking system 102 may trace the reference region 308 of the construction layout 302 with an accuracy of about +/−3 millimetres (mm).

FIGS. 4A to 4D illustrate an example representation of user interfaces (UIs) depicted in the position controller 114 for marking a single point in the reference region of the construction layout, in accordance with an embodiment of the present disclosure.

Figure 4A:
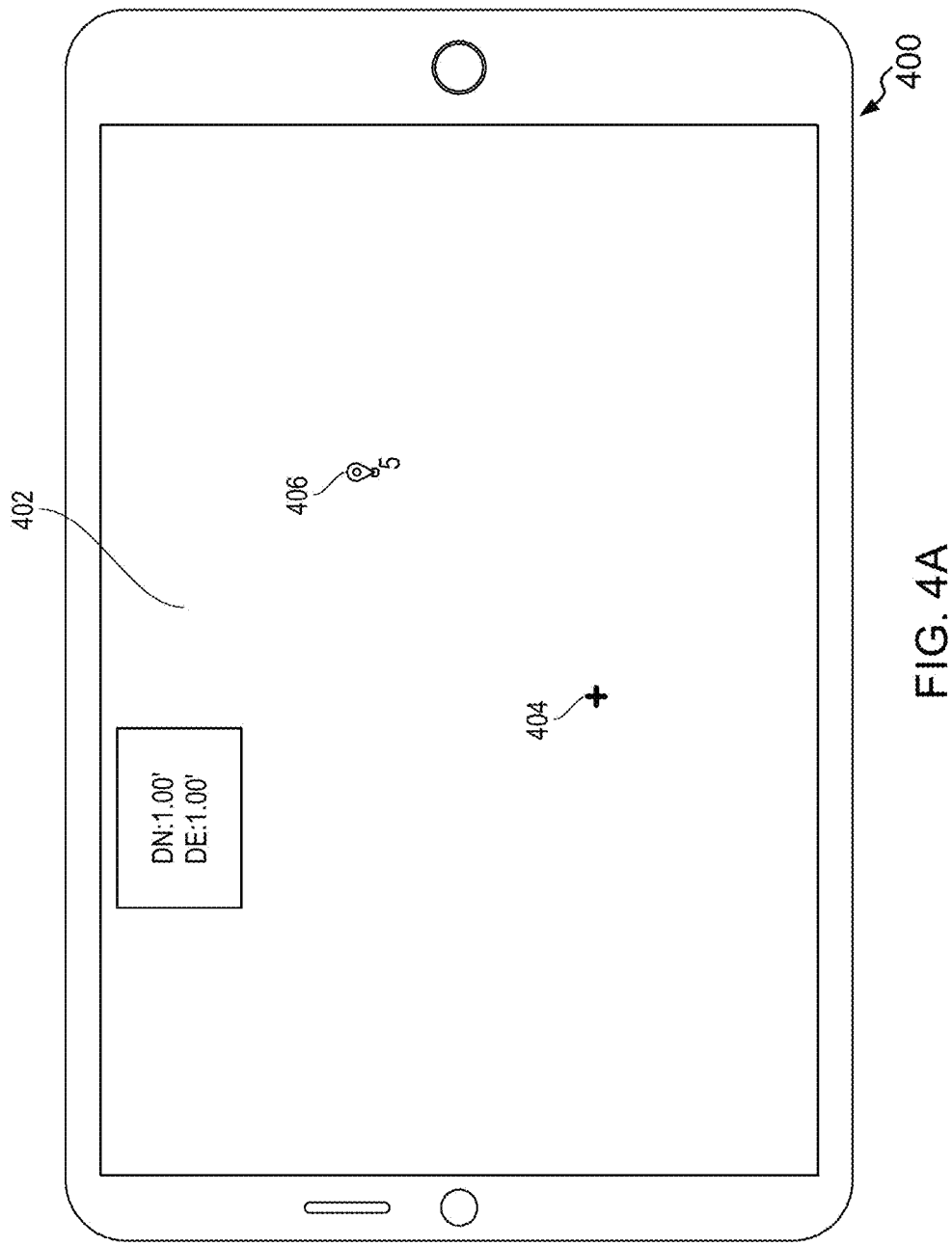
FIGS. 4A, 4B, 4C, and 4D illustrate an example representation of user interfaces (UIs) depicted in the position controller for marking a single point in a reference region of the construction layout, in accordance with an embodiment of the present disclosure.

Referring to FIG. 4A, an example representation of a user interface (UI) 400 depicting a location of the layout marking system 102 and a point to be marked in a construction layout (see, 402) is illustrated. The UI 400 depicts a current position 404 of the localization and positioning device 104 in the construction layout 402. Further, the UI 400 depicts a point 406 to be marked in the construction layout 402. The point 406 may be referred to as the reference region to be marked/traced. The position controller 114 determines the offset value and predicts the coordinate points (exemplarily depicted as 1.00 feet North, and 1.00 feet East) of the point 406 from the current position 404 to navigate the layout marking system 102 to the point 406. The operating direction depicted in the UI 400 is based at least on a standard coordinate system. However, for operating the layout marking system 102, the position controller 114 implements a cartesian coordinate system to predict the operating direction, and the operating distance for navigating the layout marking system 102 to the point 406 which is further explained in detail.

Figure 4B:
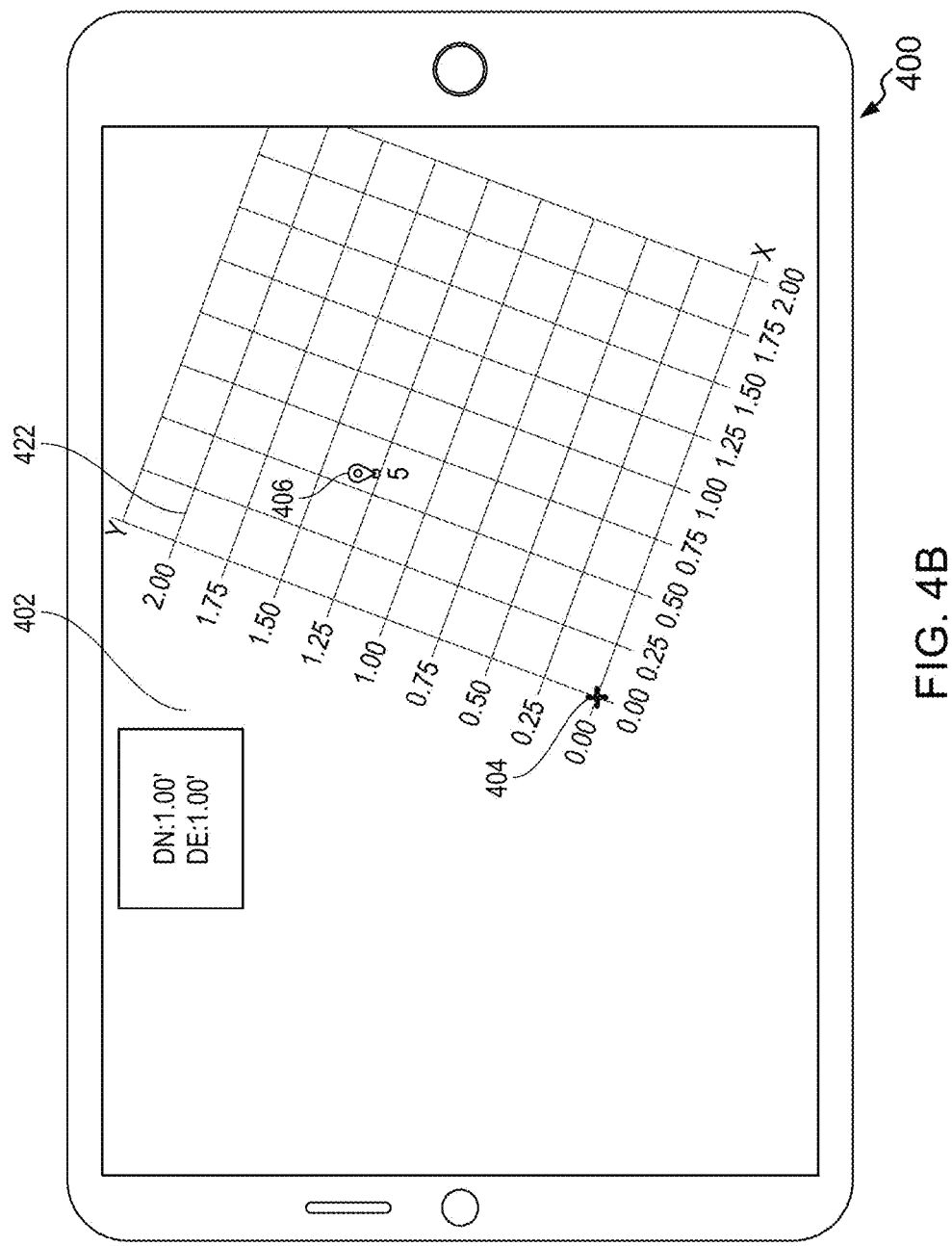

Referring to FIG. 4B, an example representation of a user interface (UI) 400 depicting a cartesian coordinate system (see, 422) is illustrated. The cartesian coordinate system 422 depicted in the UI 400 is for description purposes. The orientation of the cartesian coordinate system 422 on the construction layout 402 is based on the orientation of the layout marking system 102 in real-time (or real world layout marking system's plane). It is to be noted that the origin (0, 0) of the cartesian coordinate system 422 is positioned at the current position 404 of the layout marking system 102.

Figure 4C:
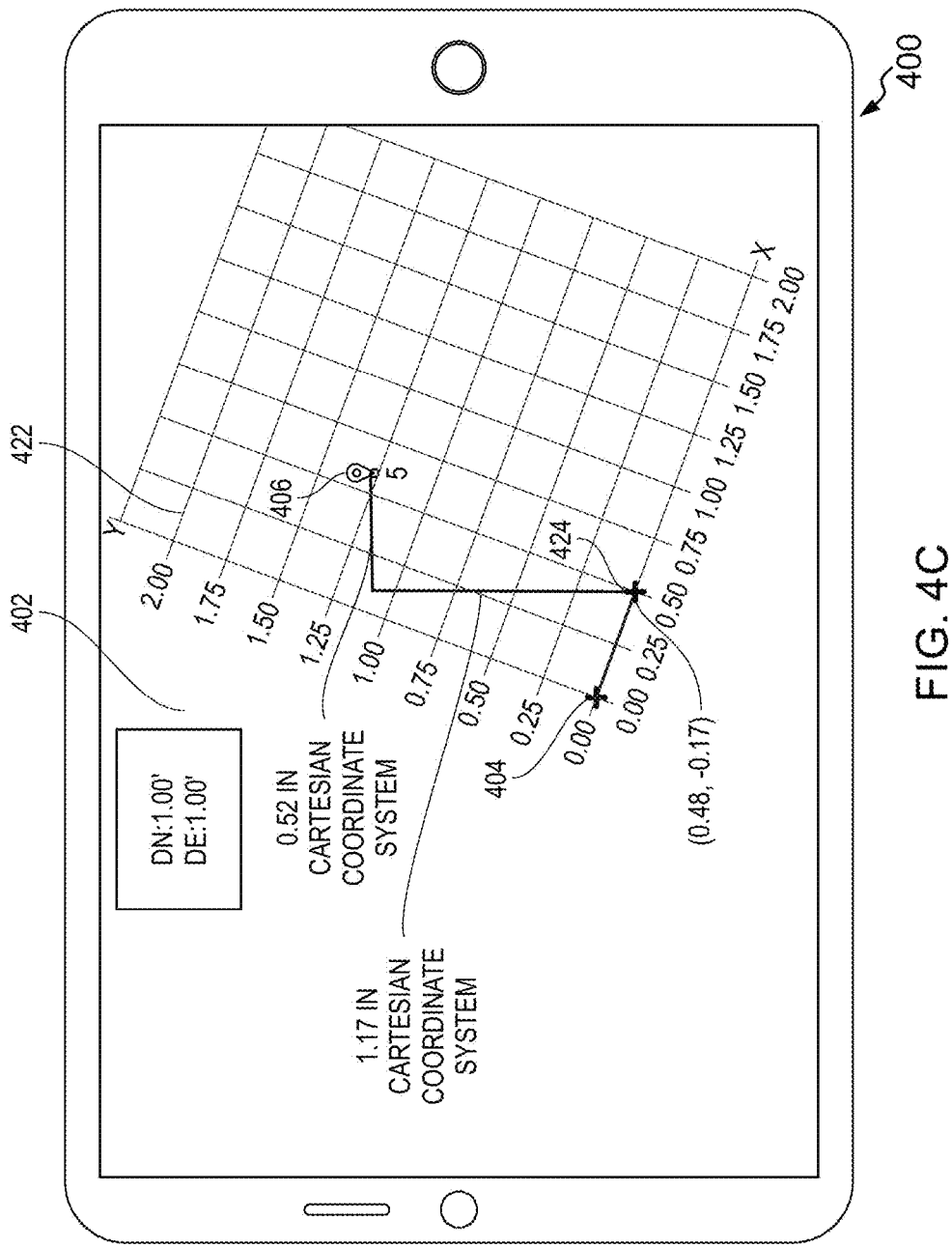
Figure 4D:
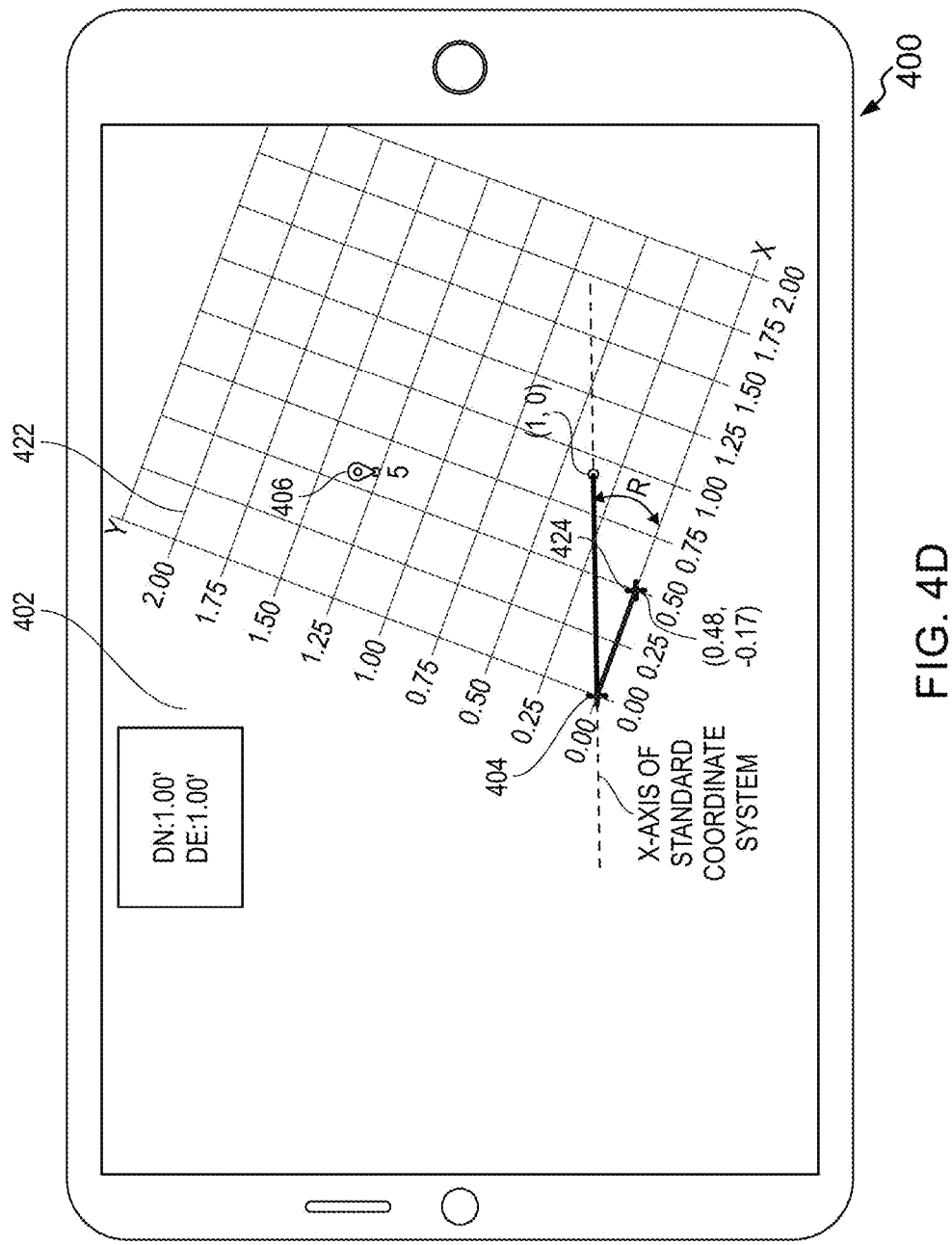

Further, to find the coordinates points corresponding to the point 406 to be marked, the layout marking system 102 may be moved along the X-axis of the cartesian coordinate system 422 by a distance (e.g., 0.50 feet) from the origin (0, 0). Hence, an updated current position (see, 424 of FIG. 4C) of the layout marking system 102 is at 0.50 feet from the origin (0, 0) (as shown in FIG. 4C).

Further, the position controller 114 is configured to determine the coordinate points of the point 406 based on the updated current position 424 and the current position 404 of the localization and positioning device 104. Thereafter, an angle of rotation of the cartesian coordinate system 422 relative to the X-axis of the standard coordinate system based on performing a vector computation of the current position 404 and the updated current position 424. The angle of rotation is exemplarily represented as 'angle R' between the X-axis of the standard coordinate system (represented using 'dashed lines' in FIG. 4D) and the origin (0, 0) of the cartesian coordinate system 422. To determine the angle of rotation R, an arbitrary point (exemplarily represented as (1, 0) is defined on the X-axis of the standard coordinate system. The angle of rotation (R) indicates the degree of rotation, the cartesian coordinate system 424 is to be rotated relative to the standard coordinate system. The coordinate points of the point 406 from the updated current position 424 are exemplarily depicted to be (0.52,1.17). In other words, the operating direction and the operating distance for navigating the layout marking system 102 to the point 406 from the updated current position 424 are represented as 1.17 to North and 0.52 to East. The layout marking system 102 is navigated to the point 406 based on the coordinate points of the point 406 for marking the point 406 in the construction layout 402. The one or more operations of the layout marking system 102 for tracing the reference region (i.e. the point 406) are explained above, therefore they are not reiterated herein for the sake of brevity.

Figure 5A:
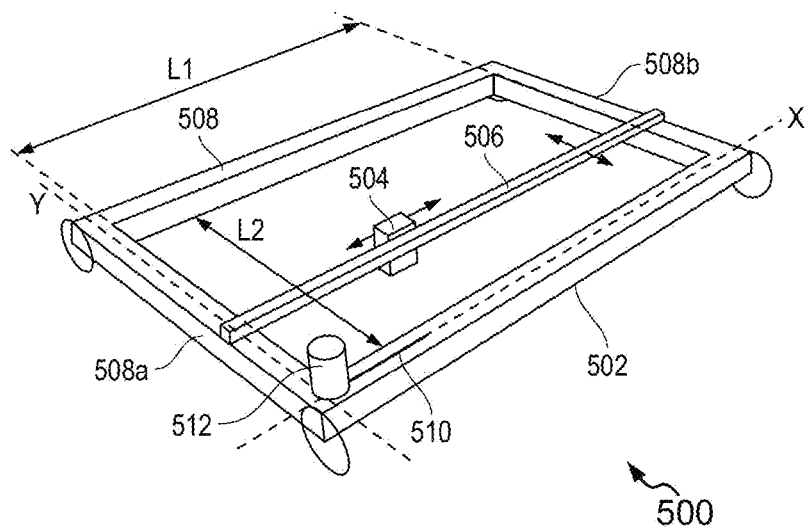
FIG. 5A illustrates a schematic representation of a support frame of a layout marking system, in accordance with an embodiment of the present disclosure.

FIG. 5A illustrates a schematic representation of a support frame 502 for a layout marking system 500, in accordance with an embodiment of the present disclosure. The layout marking system 500 is an example of the layout marking system 102. In an embodiment, the layout marking system 102 may include the support frame 502. The support frame 502 is an x-y gantry support frame. As shown, the support frame 502 includes a horizontal bridge or framework. The support frame 502 may include multiple actuators such as the actuator 126. For example, the support frame 502 includes two actuators for operating a layout marking module 504 to move along two perpendicular axes (i.e., the X-axis and the Y-axis). The layout marking module 504 is an example of the layout marking module 112. The layout marking module 504 is supported on a sub frame structure 506 slidably coupled to opposite sides (see, a side 508a and a side 508b) of a main frame 508 of the support frame 502. This enables the layout marking module 504 to move along the X-axis i.e., at least a length (L1) of the sub frame structure 506 due to the operation of an actuator as explained above. Further, the sub frame structure 506 supporting the layout marking module 504 is slidable along Y-axis or along at least a length (L2) of the main frame 508. This dual-axis movement allows the layout marking module 112 to be precisely positioned in the two-dimensional space of the construction layout 302.

In addition, the support frame 502 includes a guide rail member 510 and a localization and positioning device 512. The localization and positioning device 512 is an example of the localization and positioning device 104. Further, the localization and positioning device 512 is slidably coupled to the guide rail member 510. This allows the localization and positioning device 512 to slide along the guide rail member 510 to enable the determination of the rotation angle and the coordinate points of a target point in the construction layout as explained with reference to FIGS. 5B and 5C.

Figure 5B:
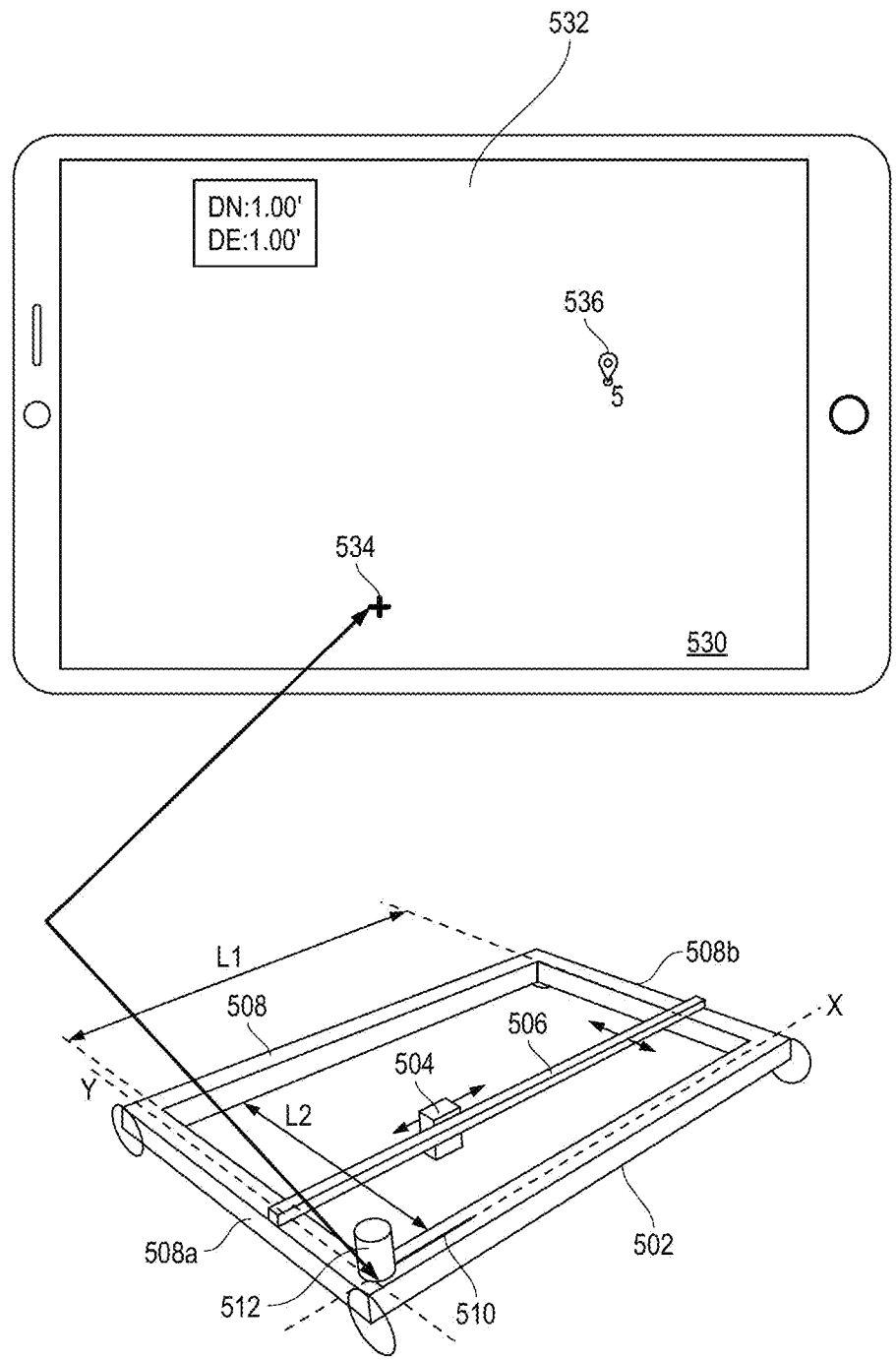
FIGS. 5B and 5C collectively illustrate an example scenario for tracing a point in a construction layout using the layout marking system of FIG. 5A, in accordance with an embodiment of the present disclosure.
Figure 5C:
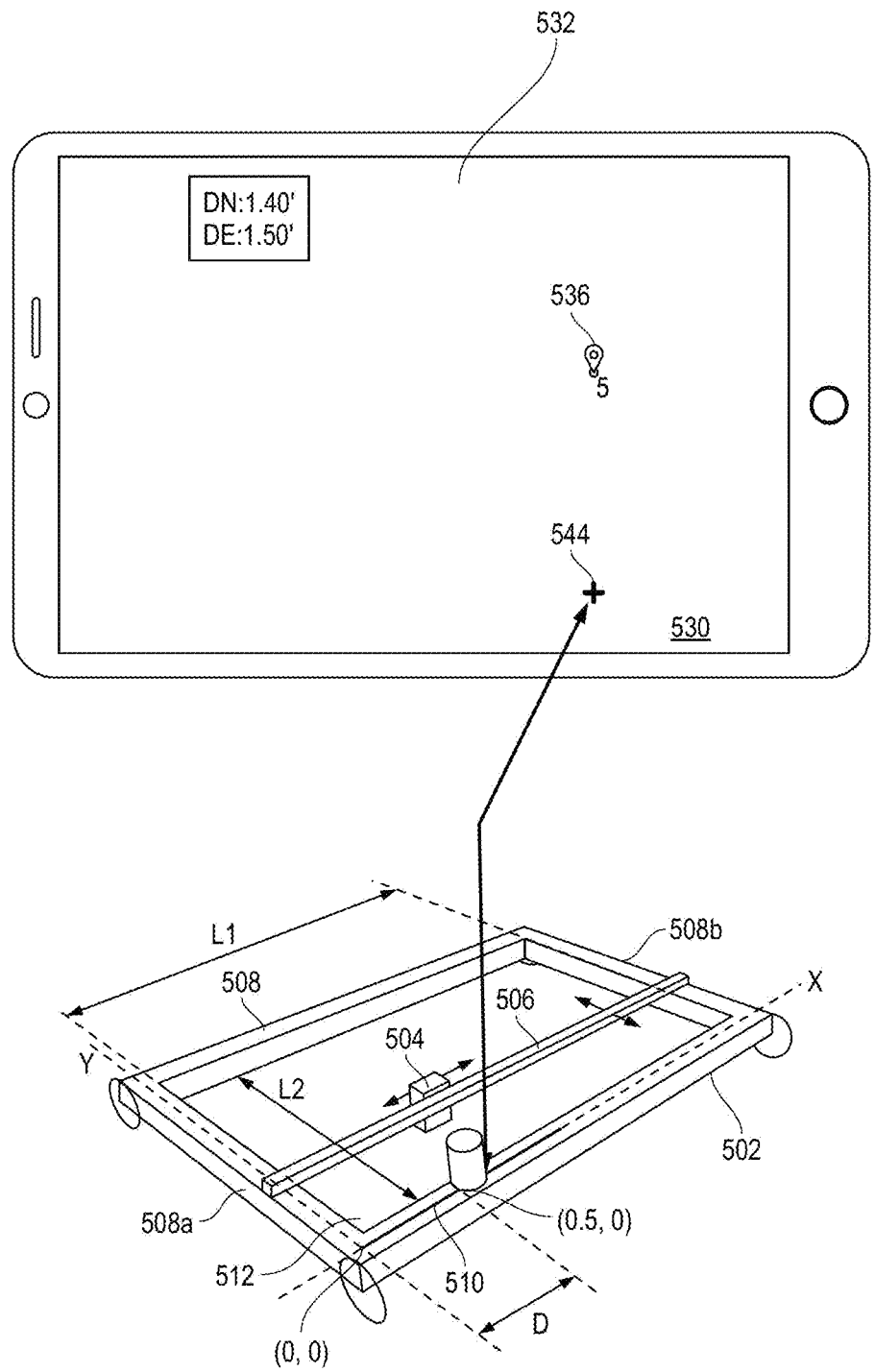

FIGS. 5B and 5C collectively illustrate an example scenario for tracing a point in a construction layout 532, in accordance with an embodiment of the present disclosure. As shown, the construction layout 532 is rendered on a user interface (UI) 530 in the position controller 114.

Referring to FIG. 5B, the UI 530 depicts a current position 534 of the localization and positioning device 512 in the construction layout 532. Further, the UI 530 depicts a point 536 (i.e. the reference region) to be marked in the construction layout 532. The point 536 may be referred to as the reference region to be marked/traced. The point 536 may be located within the area of the support frame 502 (not shown in FIGS.). Further, a position controller such as the position controller 114 determines the offset value and predicts the coordinate points (exemplarily depicted as 1.00 feet North, and 1.00 feet East) of the point 536 from the current position 534 to navigate the layout marking system 500 to the point 536. The operating direction depicted in the UI 530 is based at least on a standard coordinate system. However, for operating the layout marking system 500, the position controller 114 implements the cartesian coordinate system to predict the operating direction, and the operating distance for navigating the layout marking system 500 to the point 536 as explained above.

Referring to FIG. 5C, to find the coordinates points corresponding to the point 536 to be marked, the localization and positioning device 512 may be moved along the guide rail member 510 of the support frame 502by a distance (e.g., 0.50 feet) from the origin (0, 0) (i.e. the point or the current position534). In other words, the localization and positioning device 512 moved along the guide rail member 510 aligns with the X-axis of the standard cartesian system defined on the support frame 502. Hence, an updated current position (see, 544 of FIG. 5C) of the localization and positioning device 512 is at a distance (for example, 0.50 feet) from the origin (0, 0) (as shown in FIG. 5C). In an embodiment, the localization and positioning device 512 may be mounted to a rotating plate (not shown in FIGS.) and rotate to the desired position on the support frame 502.Alternatively, it can also be mounted on the layout marking module 504, providing flexibility in its positioning.

Further, the position controller 114 is configured to determine the coordinate points of the point 536 based on the updated current position 544 of the localization and positioning device 512. Thereafter, an angle of rotation of the cartesian coordinate system relative to the X-axis of the standard coordinate system based on performing a vector computation of the current position 534 and the updated current position 544. The layout marking system 500 is navigated to the point 536 based on the coordinate points of the point 536 for marking the point 536 in the construction layout 532. The one or more operations of the layout marking system 500 for tracing the reference region (i.e. the point 536) are explained above, therefore they are not reiterated herein for the sake of brevity.

Figure 6A:
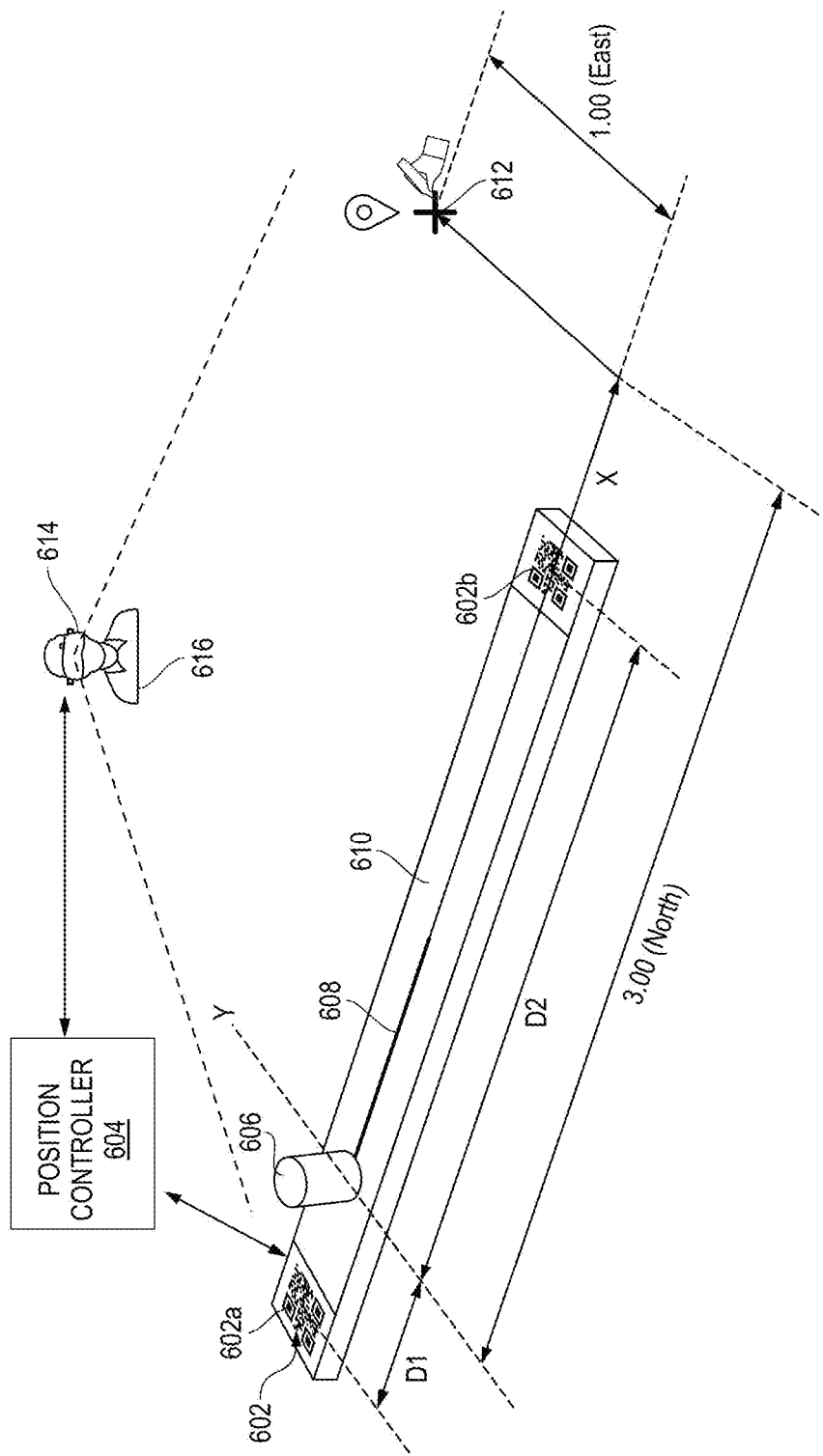
FIGS. 6A and 6B represent an example scenario of marking a point by implementing augmented reality (AR) markers coupled to a layout marking system, in accordance with an embodiment of the present disclosure.
Figure 6B:
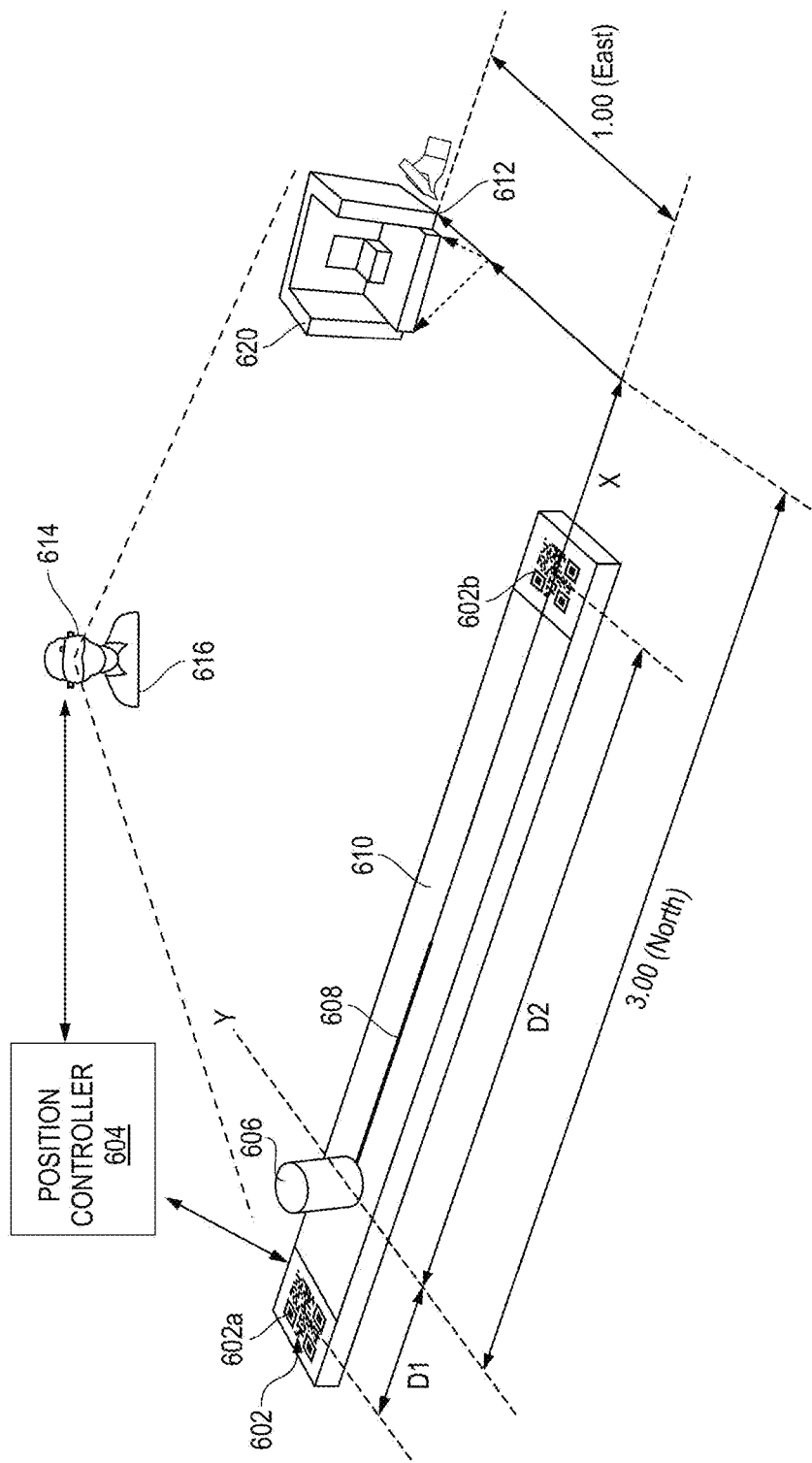

FIGS. 6A and 6B represent an example scenario of marking a point by implementing augmented reality (AR) markers 602 coupled to a layout marking system such as the layout marking system 102, in accordance with an embodiment of the present disclosure. The augmented reality (AR) markers 602 are coupled to a support frame 610 and are communicably coupled to a position controller 604. The position controller 604 is an example of the position controller 114. For example, the AR markers 602 may be a marker apparatus capable of rendering an AR overlay or an AR/VR headset. The position controller 604 facilitates the AR markers 602 to at least register the current position of the localization and positioning device such as the localization and positioning device 104 and overlay a user interface (e.g., AR interface) for enabling at least one point to be marked in the construction layout (e.g., the construction layout 402/302/532). The AR markers 602 may identify the orientation of the layout marking system 102 based at least on the cartesian coordinate system.

As shown in FIG. 6A, the AR markers 602 may include an AR marker 602a mounted at one end 610a of the support frame 610 and an AR marker 602b mounted at another end 610b of the support frame 610. Further, a localization and positioning device 606is slidably coupled to a guide rail member 608. The localization and positioning device 606 is similar to the localization and positioning device 104/512. In one embodiment, the localization and positioning device 606 is positioned at a distance D1 from the AR marker 602a and the localization and positioning device 606 is positioned at a distance D2 from AR marker 602b. For example, the distance D1 may be 0.5 pts on the X-axis, and D2 may be 2.0 pts on the X-axis. The localization and positioning device 606slidably coupled to the guide rail member 608 is allowed to slide along the guide rail member 608to enable the determination of the rotation angle and the coordinate points of the point are determined as explained with references to FIGS. 5A-5C or FIGS. 4A-4D.

In particular, an initial position of the localization and positioning device 606 on the guide rail member 608 may be (0, 0). The localization and positioning device 606 may be traversed along the guide rail member 608 by a distance of 0.5 pts. Thus, the updated position of the localization and positioning device 606 is (0, 0.5). Based on the initial position and the updated position of the localization and positioning device 606, the coordinates of the AR markers 602a and 602b are determined as the AR markers 602a and 602b are positioned at predefined distances (i.e., the distances D1 and D2) from the localization and positioning device 606. Thereafter, the coordinates of the AR markers 602a and 602b are communicated to the position controller 604. The position controller 604 further transmits the coordinate points of a reference region and the coordinates of the AR markers 602a and 602b to an application equipped in an augmented reality (AR) device 614 associated with a user 616. The reference region may include at least one point 612 to be marked. For illustration purposes, the coordinate points of the point 612 to be marked are depicted to be 3.00 (North) and 1.00 (East).

Referring to FIG. 6B, the AR device 614 may render (or project) an augmented reality (AR) interface depicting a construction layout 620 to allow the user 616 to mark the point 612 in the construction layout 620 using the coordinates of the AR markers 602a and 602b as reference points. It is to be noted that the AR markers 602a and 602b and the point 612 to be marked should be within a field of view (FOV) of the AR device 614 for rendering the construction 620 depicting the point 612. Once the point 612 to be marked is depicted, the user 616 may manually mark the point 612 in the construction layout 620. For illustration purposes, manually marking the point 612 by the user 616 is depicted using a hand gesture in in FIGS. 6A and 6B. Additionally, the AR device 614 may render other probable points of the construction layout 620 that may be marked by the user 616.

Figure 7:
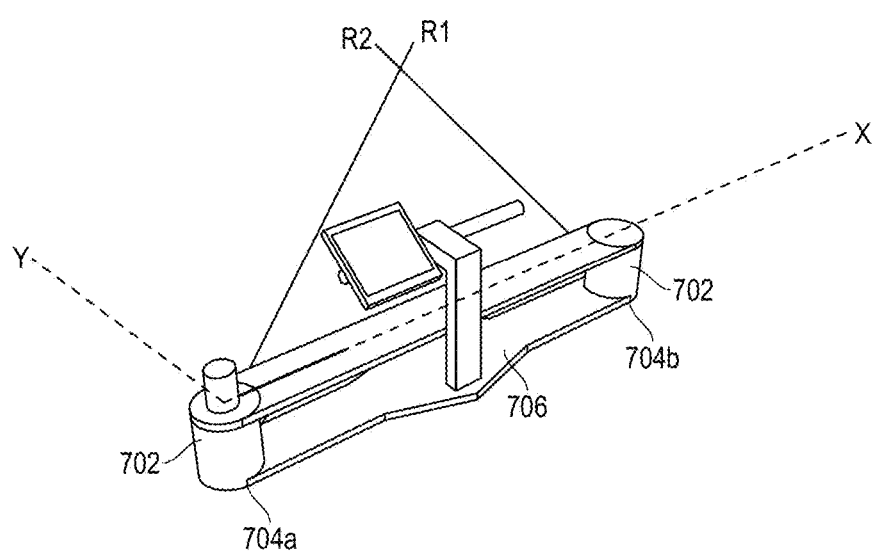
FIG. 7 illustrates a schematic representation of a layout marking system depicting a radiating light source for determining a point to be marked in the construction layout, in accordance with an embodiment of the present disclosure.

FIG. 7 illustrates a layout marking system mounted with a radiating light source 702 for determining a point to be marked in a construction layout, in accordance with an embodiment of the present disclosure. As shown, a layout marking system such as the layout marking system 102 includes the radiating light source 702 mounted to a support frame 706. In one embodiment, the radiating light source 702 may be mounted to each end (see, end 704a and end 704b) of the support frame 706. In an embodiment, the support frame 706 may be configured to be a perpendicular structure or L-shaped structure. Alternatively, the radiating light source 702 may be rotatably mounted at any other location in the support frame 706 as per the design feasibility and requirements. For example, the radiating light source 702 may be line lasers.

In operation, the radiating light source 702 rotates to determine the point in the construction layout. As such, the intersection point of radiating light (exemplarily depicted as R1 and R2) being emitted by the radiating light source 702 enables the determination of the point to be marked in the construction layout. The angle of rotation for the radiating light source 702 is obtained using the approach of determining the angle of rotation as explained with references to FIGS. 5A-5C.

Figure 8:
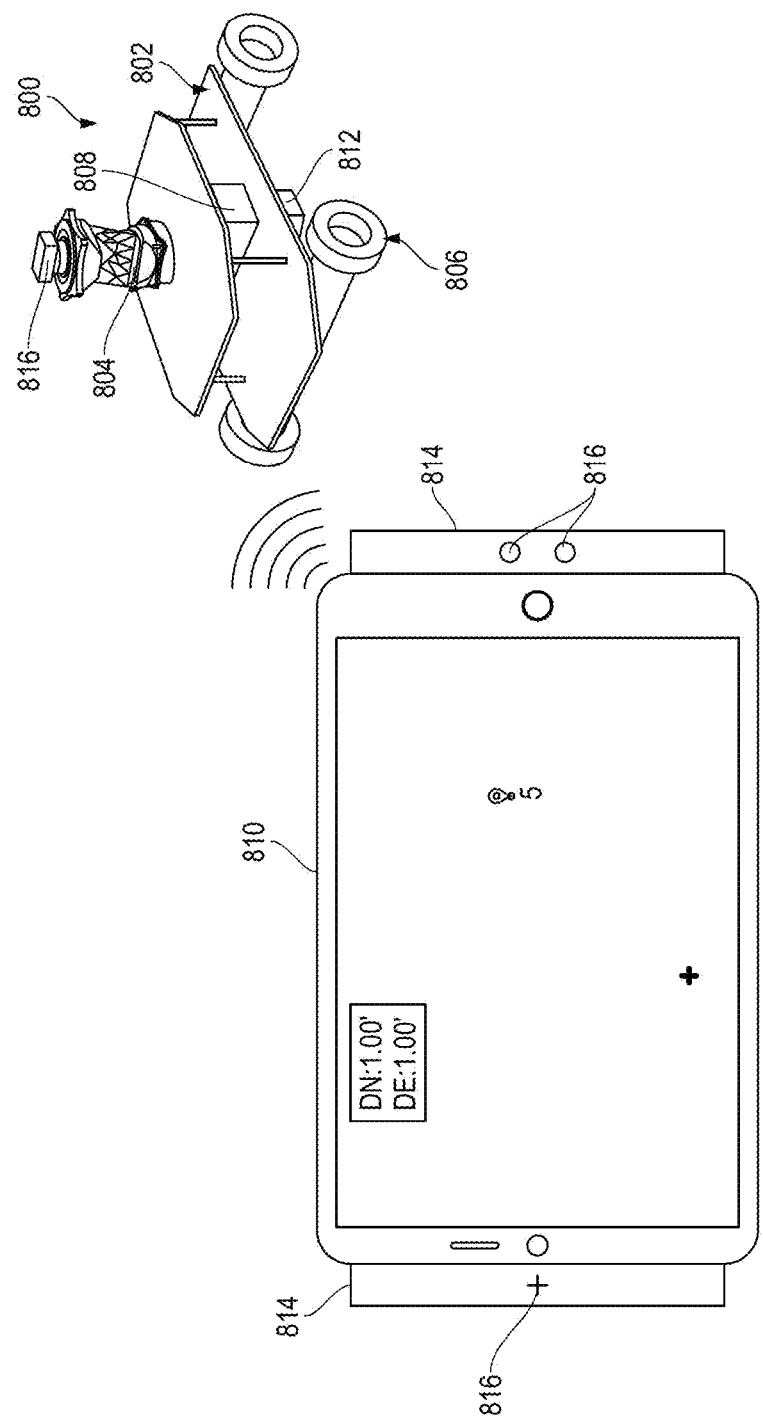
FIG. 8 illustrates a schematic representation of a layout marking system for tracing a reference region in a construction layout, in accordance with an embodiment of the present disclosure.

FIG. 8 illustrates a schematic representation of a layout marking system 800 for tracing a reference region in a construction layout, in accordance with an embodiment of the present disclosure. The layout marking system 800 is similar to the layout marking system 102. The layout marking system 800 includes a support frame 802, a localization and positioning device 804, a sensor unit 806, a maneuvering unit 806, a control circuitry 808, a position controller 810, a layout marking module 812, and a controller 814. In one scenario, the position controller 810 may be mounted to a handlebar similar to the layout marking system 102. In another scenario, the position controller 810 may be handheld by a user. The layout marking system 800 may include other components as explained with references to FIGS. 1A and 1B.

As shown, the controller 814 is connected to the position controller 810. In an embodiment, the controller 814 may be wirelessly connected to the position controller 810. The controller 814 is configured to operate the maneuvering unit 806 based on the receipt of coordinate points of a point to be marked in the construction layout. In an embodiment, the controller 814 may be positioned in the vicinity (e.g., within a predefined distance) of the layout marking system 800. In this scenario, the controller 814 may communicate with the layout marking system 800 using short-range communication protocols for operating the maneuvering unit 806 or controlling the layout marking system 800. In another embodiment, the controller 814 may be located remotely and is communicably coupled to the layout marking system 800 via the Internet. In this scenario, the controller 814 may receive the instructions from the layout marking system 800 and provide control signals to operate the layout marking system 800 via the Internet.

Further, the determination of the coordinate points of the point to be marked based on applying the screen grab feature is explained above, therefore it is not reiterated herein for the sake of brevity. Further, the control circuitry 808 may include a communication interface (e.g., a transceiver) for receiving instructions from at least the controller 814 and the position controller 810 for operating the maneuvering unit 806.

In one scenario, the coordinate points of the point to be marked in the construction layout are transmitted to the controller 814. The controller 814 includes a set of control buttons 816 for at least operating the maneuvering unit 806 to maneuver the layout marking system 800 to the reference region (i.e. the point to be marked) and operating the layout marking module 812 for tracing the reference region. Once, the controller 814 receives the coordinate points, a user may operate the set of control buttons to operate the maneuvering unit 806 to move the layout marking system 800 to the reference region (or the point to be marked) in the construction layout and operate the layout marking module 812 to mark the point. The control circuitry 812 includes a communication interface (e.g., a transceiver) for receiving control instructions from the controller 814 for operating the maneuvering unit 806 and the layout marking module 812. It is to be understood that the control instructions are generated based on the user inputs on the set of control buttons 816. In addition, before the user starts the marking process, the layout marking system 800 may be adjusted in a predefined direction (e.g., north direction).

In another scenario, the position controller 810 may operate the maneuvering unit 806 and the layout marking module 812 upon extracting the coordinate points of the point to be marked in the construction layout. As explained above, the position controller 810 may transmit control instructions to the control circuitry 808 to operate the maneuvering unit 806 and the layout marking module 812. The one or more operations related to extracting the coordinate points of the reference region (i.e. the point to be marked), tracing the reference region, and the like, are explained in detail with references to FIGS. 1A-1B to FIGS. 4A-4D, therefore they are not reiterated herein for the sake of brevity.

Figure 9:
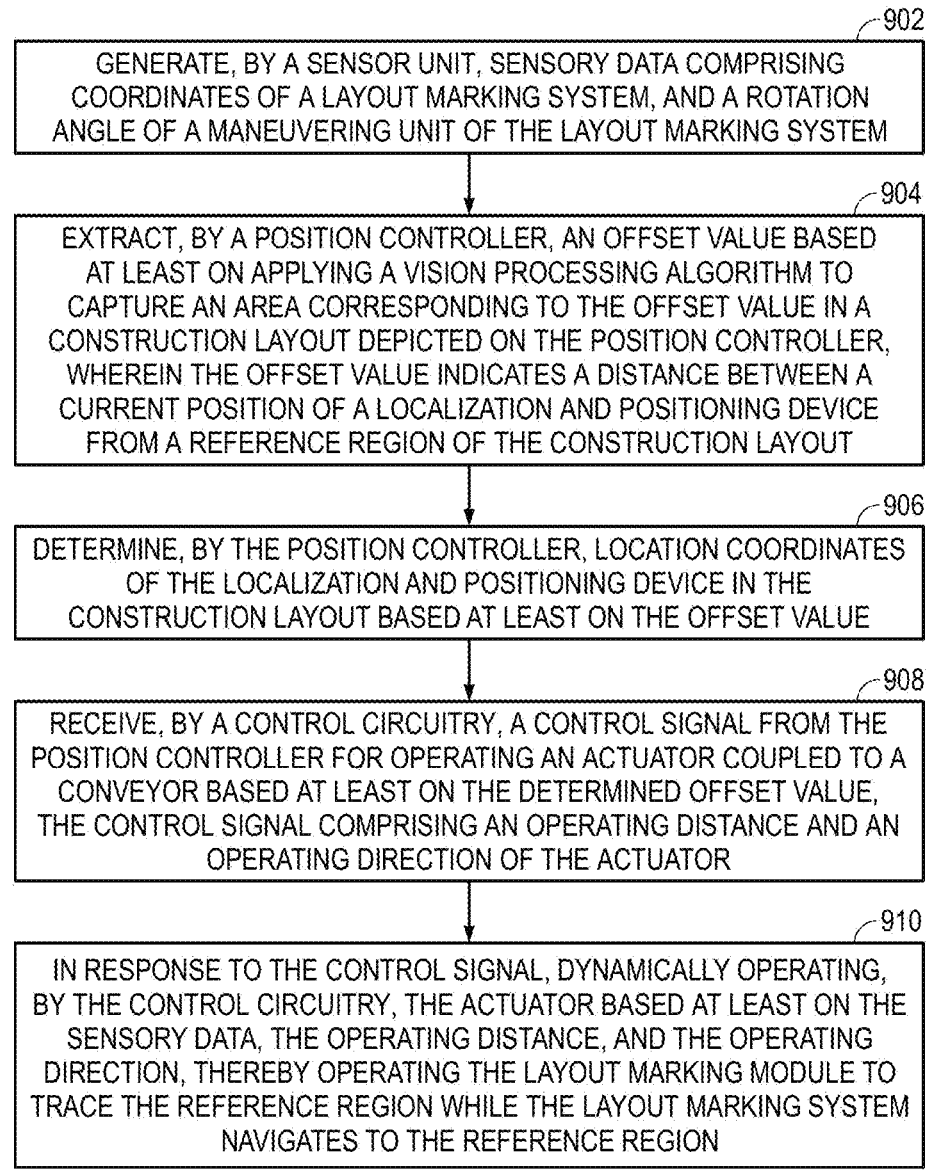
FIG. 9 illustrates a flow diagram of a method performed by the layout marking system for tracing a reference region in a construction layout, in accordance with an example embodiment of the present disclosure.

FIG. 9 illustrates a flow diagram of a method 900 performed by the layout marking system 102 for tracing the reference region 308 in the construction layout (e.g., the construction layout 302), in accordance with an example embodiment of the present disclosure.

At step 902, the method 900 includes generating, by the sensor unit 106, sensory data including coordinates of the layout marking system 102, and a rotation angle of a maneuvering unit of the layout marking system 102.

At step 904, the method 900 includes extracting, by the position controller 114, an offset value based at least on applying a vision processing algorithm to capture an area corresponding to the offset value in a construction layout (e.g., the construction layout 302) depicted on the position controller 114. The offset value indicates a distance between a current position of the localization and positioning device 104 from a reference region of the construction layout 302.

At step 906, the method 900 includes determining, by the position controller 114, location coordinates of the localization and positioning device 104 in the construction layout 302 based at least on the offset value.

At step 908, the method 900 includes receiving, by the control circuitry 124, a control signal from the position controller 114 for operating an actuator 126 coupled to a conveyor 108 based at least on the determined offset value. The control signal includes an operating distance and an operating direction of the actuator 126.

At step 910, the method 900 includes in response to the control signal, dynamically operating, by the control circuitry 124, the actuator 126 based at least on the sensory data, the operating distance, and the operating direction, thereby operating the layout marking module 112 to trace the reference region while the layout marking system 102 navigates to the reference region. The one or more operations performed by the layout marking system 102 are already explained with reference to FIGS. 1A-1B to FIG. 8, therefore they are not reiterated herein for the sake of brevity.

Various embodiments of the present disclosure offer multiple advantages and technical effects. The layout marking system of the present disclosure is user-friendly and requires minimal skill for tracing out complex geometries. The layout marking system and the method of the present disclosure enable efficient marking of the layout and reduce the time of tracing the layout compared to the traditional manual way of tracing the layout. The present disclosure provides a cost-effective layout marking system and the layout marking system is device-agnostic with simple structural configuration.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A layout marking system, comprising:
    a support frame;
    a localization and positioning device movably disposed on the support frame via a conveyor associated with the support frame;
    a sensor unit configured to generate sensory data comprising coordinates of the layout marking system, and a rotation angle of a maneuvering unit of the layout marking system;
    a layout marking module coupled to the support frame via the conveyor, thereby allowing the layout marking module to move along a length of the support frame;
    a position controller configured to at least:
        extract an offset value based at least on applying a vision processing algorithm to capture an area corresponding to the offset value in a construction layout depicted on the position controller, and
        determine a current position of the localization and positioning device in the construction layout based at least on the offset value, wherein the offset value indicates a distance between the current position of the localization and positioning device from a reference region of the construction layout; and
    a control circuitry communicably coupled to the position controller, the layout marking module, and the sensor unit, the control circuitry configured to at least:
        receive a control signal from the position controller for operating an actuator coupled to the conveyor based at least on the determined offset value, the control signal comprising an operating distance, and an operating direction of the actuator, and
        in response to the control signal, dynamically operate the actuator based at least on the sensory data, the operating distance, and the operating direction, thereby operating the layout marking module to trace the reference region while the layout marking system navigates to the reference region.

2. The layout marking system as claimed in claim 1, wherein determining the current position of the localization and positioning device comprises:
    identify a class among a set of classes associated with each variable of the offset value;
    extract coordinate points defined for the class associated with each variable of the offset value; and
    determine the current position of the localization and positioning device in the construction layout based at least on the coordinate points associated with each variable of the offset value.

3. The layout marking system as claimed in claim 1, wherein operating the layout marking module to trace the reference region further comprises:
    determine whether the localization and positioning device is within a threshold operating range for tracing the reference region of the construction layout, wherein the control circuitry determines whether the localization and positioning device is within the threshold operating range based at least on the sensory data and visual odometry; and
    in response to determining the localization and positioning device is within the threshold operating range, dynamically operate the actuator based at least on the sensory data, the operating distance, and the operating direction, thereby operating the layout marking module to trace the reference region.

4. The layout marking system as claimed in claim 3, wherein dynamically operating the actuator enables the layout marking module to perform at least one of:
    trace a pathway of the layout marking system while the layout marking system navigates to the reference region of the construction layout and is positioned within the threshold operating range, and
    trace at least one point in the reference region of the construction layout upon positioning the layout marking system within the threshold operating range.

5. The layout marking system as claimed in claim 3, wherein the layout marking system further comprises a limit switch communicably coupled to the control circuitry, the limit switch configured to at least:
    facilitate the layout marking module to operate between the threshold operating range; and
    transmit an alert signal to the position controller based on determining the layout marking module is positioned at a distance exceeding the threshold operating range.

6. The layout marking system as claimed in claim 1, wherein the position controller is configured at least, in part to:
    obtain image data related to the layout marking system positioned at different positions in the construction layout, the image data comprising one or more offset features assigned for each position of the construction layout;
    identify a class among a set of classes for each offset feature of the one or more offset features, the one or more offset features correspond to the offset value; and
    upon identifying the class for each offset feature, define each offset feature of the one or more offset features for the corresponding class of the set of classes to generate a training dataset for determining the location coordinates of the localization and positioning device based at least on the offset value.

7. The layout marking system as claimed in claim 1, wherein the sensor unit comprises:
    a first sensor unit communicably coupled to the control circuitry, the first sensor unit comprising a plurality of sensors configured to at least compute a displacement metric of the layout marking system, wherein the first sensor unit corresponds to an attitude and heading reference system (AHRS) of the layout marking system; and
    a second sensor unit communicably coupled to the control circuitry, the second sensor unit configured to determine a rotation angle of a maneuvering unit of the layout marking system.

8. The layout marking system as claimed in claim 7, wherein the control circuitry is configured to at least determine the coordinates of the current position of the layout marking system based at least on displacement metric and the rotation angle of the maneuvering unit.

9. The layout marking system as claimed in claim 8, wherein the control circuitry determines the coordinates of the current position of the layout marking system based at least on applying a Kalman filtering technique.

10. The layout marking system as claimed in claim 1, wherein the localization and positioning device is configured to sense an electronic distance measurement (EDM) signal relative to a layout surveying apparatus, and wherein the position controller navigates the layout marking system based on the electronic distance measurement (EDM) signal from the localization and positioning device.

11. The layout marking system as claimed in claim 1, wherein the actuator is configured to operate within a predefined range of about-20 inches to about +20 inches for enabling the layout marking module to operate in the threshold operating range for tracing the reference region of the construction layout.

12. The layout marking system as claimed in claim 1, further comprising:
at least one first image sensor mounted to a front portion of the support frame and communicably coupled to the control circuitry, wherein the control circuitry is configured to track visual odometry of the layout marking system via the at least one first image sensor; and
at least one second image sensor communicably coupled to the control circuitry, wherein the at least one second image sensor is configured to monitor the tracing of the layout marking module and extrapolate direction of movement of the layout marking system,
wherein the position controller transmits the control signal to the control circuitry for operating the actuator to align the layout marking module to trace the reference region while the layout marking system navigates to the reference region.

13. The layout marking system as claimed in claim 1, wherein the support frame is an x-y gantry support frame.

14. The layout marking system as claimed in claim 1, wherein the position controller is communicably coupled to augmented reality (AR) markers mounted on the support frame and an augmented reality (AR) device,
wherein the position controller transmits coordinates of the augmented reality (AR) markers and coordinate points of the reference region to the augmented reality (AR) device, wherein the coordinates of the augmented reality (AR) markers are determined based at least on an initial position and an updated position of the localization and positioning device,
wherein the augmented reality (AR) device renders an augmented reality (AR) interface depicting the construction layout and the reference region to be marked in the construction layout.

15. The layout marking system as claimed in claim 1, further comprising a radiating light source rotatably coupled to each end of the support frame, the radiating light source configured to rotate based on an angle of rotation and simultaneously emanate a radiating light for determining at least one point to be marked in the construction layout.

16. A method for tracing reference regions in a construction layout, the method comprising:
generating, by a sensor unit, sensory data comprising coordinates of a layout marking system, and a rotation angle of a maneuvering unit of the layout marking system;
extracting, by a position controller, an offset value based at least on applying a vision processing algorithm to capture an area corresponding to the offset value in a construction layout depicted on the position controller, wherein the offset value indicates a distance between a current position of a localization and positioning device from a reference region of the construction layout;
determining, by the position controller, location coordinates of the localization and positioning device in the construction layout based at least on the offset value;
receiving, by a control circuitry, a control signal from the position controller for operating an actuator coupled to a conveyor based at least on the determined offset value, the control signal comprising an operating distance and an operating direction of the actuator; and
in response to the control signal, dynamically operating, by the control circuitry, the actuator based at least on the sensory data, the operating distance, and the operating direction, thereby operating the layout marking module to trace the reference region while the layout marking system navigates to the reference region.

17. The method as claimed in claim 16, further comprising:
identifying, by the position controller, a class among a set of classes associated with each variable of the offset value;
extracting, by the position controller, coordinate points defined for the class associated with each variable of the offset value; and
determining, by the position controller, the location coordinates corresponding to the offset value based at least on the coordinate points associated with each variable of the offset value.

18. The method as claimed in claim 16, further comprising:
determining, by the control circuitry, whether the localization and positioning device is within a threshold operating range for tracing the reference region of the construction layout, wherein the control circuitry determines whether the localization and positioning device is within the threshold operating range based at least on the sensory data and visual odometry; and
in response to determining the localization and positioning device is within the threshold operating range, dynamically operating, by the control circuitry, the actuator based at least on the sensory data for operating the layout marking module to trace the reference region.

19. The method as claimed in claim 18, wherein dynamically operating the actuator enables the layout marking module to perform at least:
trace a pathway of the layout marking system while the layout marking system navigates to the reference region of the construction layout and is positioned within the threshold operating range; and
trace at least one point in the reference region of the construction layout upon positioning the layout marking system within the threshold operating range.

20. The method as claimed in claim 16, further comprising:
obtaining, by the position controller, image data related to the layout marking system at different positions in the construction layout, the image data comprising one or more offset features assigned for each position of the construction layout;

identifying, by the position controller, a class among a set of classes for each offset feature of the one or more offset features, each offset feature of the one or more offset features correspond to each variable of the offset value; and upon identifying the class for each offset feature, defining, by the position controller, each offset feature of the one or more offset features for the corresponding class of the set of classes to generate a training dataset for determining the location coordinates of the localization and positioning device based at least on the offset value.

* * * * *